US007978365B2

(12) United States Patent
Nabeshima

(10) Patent No.: US 7,978,365 B2
(45) Date of Patent: Jul. 12, 2011

(54) DOCUMENT TYPE DISCRIMINATING APPARATUS

(75) Inventor: Takayuki Nabeshima, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1241 days.

(21) Appl. No.: 10/443,895

(22) Filed: May 23, 2003

(65) Prior Publication Data

US 2004/0165200 A1 Aug. 26, 2004

(30) Foreign Application Priority Data

Feb. 26, 2003 (JP) ................................ 2003-048645

(51) Int. Cl.
*H04N 1/409* (2006.01)
*H04N 1/58* (2006.01)
(52) U.S. Cl. .......... 358/1.9; 358/2.1; 358/3.06; 358/3.1; 358/3.26; 382/137
(58) Field of Classification Search .................. 358/1.9, 358/2.1, 3.06, 3.1, 3.26; 382/137
See application file for complete search history.

(56) References Cited

U.S. PATENT DOCUMENTS

| | | | | |
|---|---|---|---|---|
| 5,481,378 A | * | 1/1996 | Sugano et al. | 358/501 |
| 5,647,010 A | * | 7/1997 | Okubo et al. | 382/100 |
| 6,091,520 A | | 7/2000 | Hibi et al. | |
| 6,388,767 B1 | * | 5/2002 | Udagawa et al. | 358/1.9 |
| 6,396,927 B1 | * | 5/2002 | Phillips | 380/54 |
| 6,859,534 B1 | * | 2/2005 | Alasia | 380/51 |
| 6,987,882 B2 | * | 1/2006 | Curry et al. | 382/173 |
| 2001/0009591 A1 | * | 7/2001 | Hiraishi et al. | 382/165 |
| 2002/0097903 A1 | * | 7/2002 | Prakash | 382/137 |

FOREIGN PATENT DOCUMENTS

| | | |
|---|---|---|
| JP | 7-298074 | 11/1995 |
| JP | 7-307861 | 11/1995 |
| JP | 8-130636 | 5/1996 |

* cited by examiner

*Primary Examiner* — David K Moore
*Assistant Examiner* — Quang N Vo
(74) *Attorney, Agent, or Firm* — Buchanan Ingersoll & Rooney PC

(57) ABSTRACT

A document type discriminating apparatus is provided in which discrimination as to whether or not a document is a duplicate is made with high degree of accuracy. The document type discriminating apparatus includes means for discriminating whether a type of a screen pattern used in an image captured by reading a document is a line screen, means for detecting whether a value indicating a change in a period of the screen used in the image exceeds a predetermined value, means for detecting whether a value indicating sharpness of an edge seen in the image is lower than a predetermined value, means for detecting whether a value indicating a blur in an edge color seen in the image exceeds a predetermined value, and means for discriminating that the document is a duplicate when at least two out of the four detection results mentioned above are true.

12 Claims, 25 Drawing Sheets

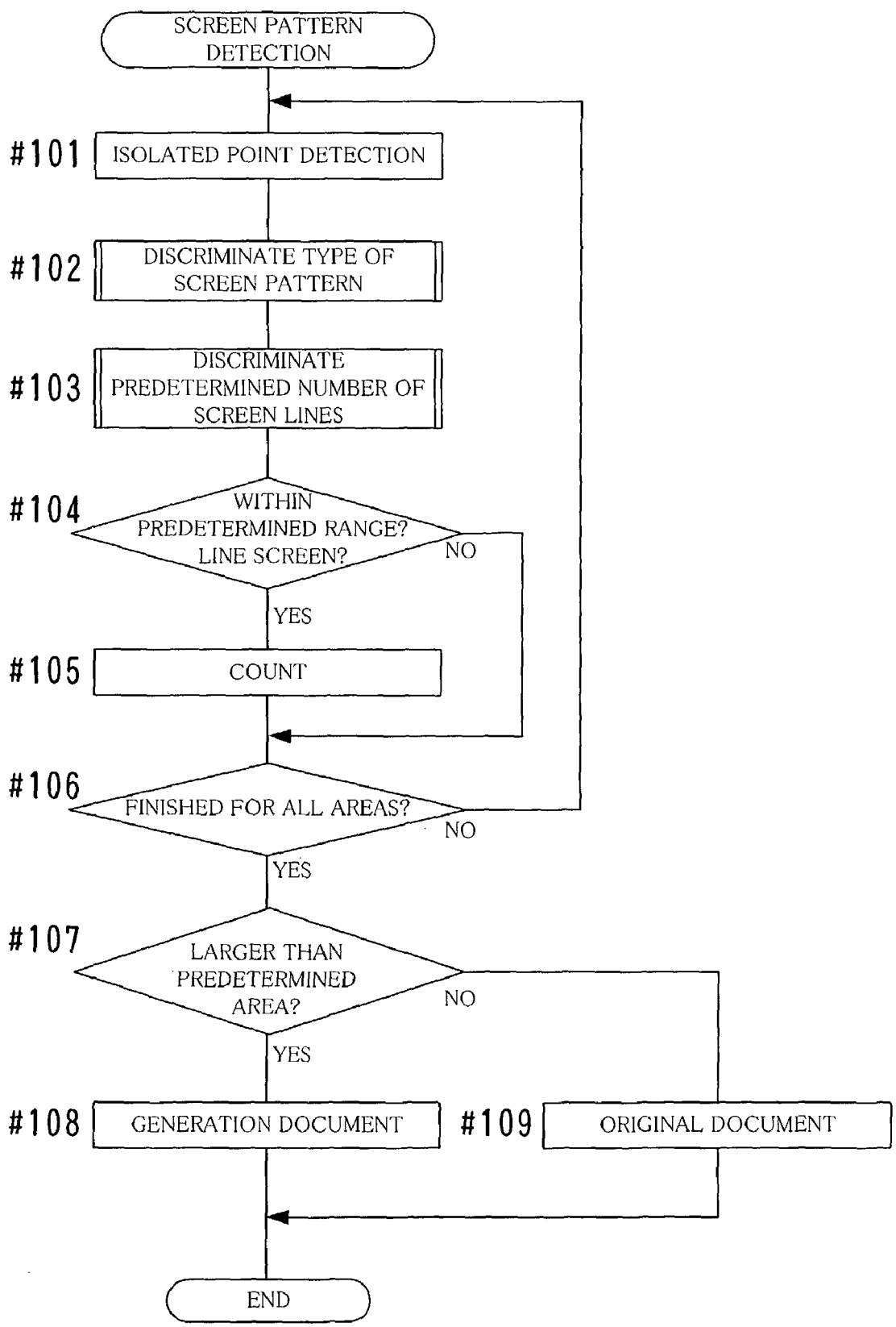

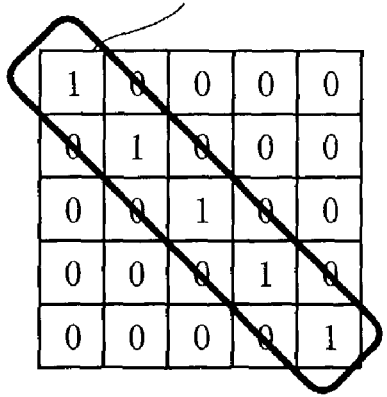

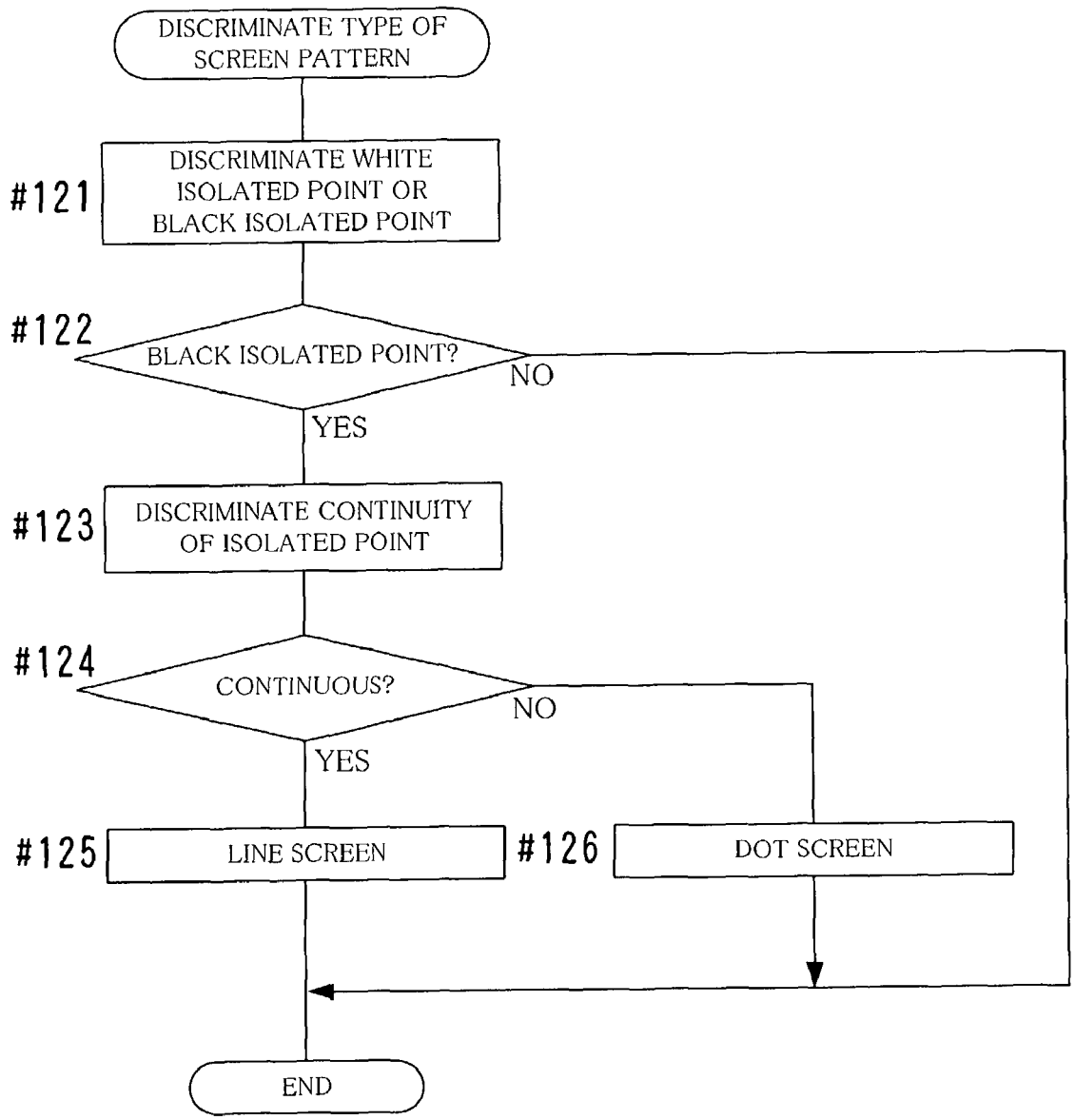

DIVISION AREA

DIVISION AREA

DOCUMENT TYPE DISCRIMINATING APPARATUS

This application is based on Japanese Patent Application No. 2003-048645 filed on Feb. 26, 2003, the contents of which are hereby incorporated by reference.

BACKGROUND OF THE INVENTION

1. Field of the Invention

The present invention relates to an apparatus for discriminating a type of document, an image of which is read by an image sensor or a scanner unit.

2. Description of the Prior Art

Comparison between an original document and a duplicate (a copy) thereof proves that deterioration occurs in the duplicate, for example, an indentation appears at an edge of a line drawing or a character, a halftone dot appears in a background color, or in a subtle color in a picture such as a portion of human skin, or a color is replaced by a color different from that of an original document. When the duplicate in which the deterioration mentioned above occurs is used as a document to be duplicated to produce a copy, i.e., when a copied document is copied, further deterioration may occur under the same process as the case of reproducing an original document.

There is proposed a method in which a process is performed for a scanned image of a document in reproducing the document, the process depending on the type of the document. According to the invention disclosed in related patent publication 1 mentioned below, for example, it is discriminated whether a document is an original document or a copied document thereof (hereinafter referred to as a "generation document"), and parameters for black character processing are changed based on the discrimination result and a process is conducted. Each of related patent publications 2 and 3 mentioned below discloses a process depending on a type of document, similarly to the related patent publication 1.

Thus, processing contents are changed depending on whether a document is an original document or a generation document, thereby ensuring that deterioration seen in an image of a duplicate can be minimized and the duplicate close to an original document can be obtained.

The related patent publications 1 to 4, which are mentioned below, disclose methods for discriminating a type of document mentioned below. According to the related patent publication 1, a document is discriminated as an original document when a plurality of pixels in a scanned image of a document cannot be reproduced in outputting the image to a sheet of paper. When one or less pixel cannot be reproduced, the document is discriminated as a generation document.

According to the method, however, when a scanned image of a document has low saturation, one or less pixel cannot be reproduced even if the document is a generation document. Therefore, the document may be determined as an original document by mistake. Additionally, when a document to be read is a colored paper or marked with a writing material, also, there is a case where improper discrimination may be made.

According to the related patent publication 2, an image having a predetermined pattern embedded is reproduced on a sheet of paper. A document is determined as a generation document when the pattern is detected from the scanned image of the document in reproduction. A document is determined as an original document when the pattern is not detected. The related patent publication 3 discloses that a predetermined pattern is embedded at reproduction, similarly to the related patent publication 2. The method in the related patent publication 3, however, is inapplicable to a case where a document to be reproduced is a duplicate output from a copier with no function of embedding the pattern. Accordingly, there is a situation where a document to be reproduced is discriminated as an original document by mistake even if the document to be reproduced is a generation document.

According to the related patent publication 4, it is discriminated whether a document is a character document, a photodocument or a halftone dot document, and correction processing is conducted, the processing being different depending on the type of the document. However, it is impossible to determine whether a document is an original document or a generation document using this method.

Related Patent Publication 1:
  Japanese unexamined patent publication No. 8-130636
Related Patent Publication 2:
  Japanese unexamined patent publication No. 7-307861
Related Patent Publication 3:
  U.S. Pat. No. 6,091,520
Related Patent Publication 4:
  Japanese unexamined patent publication No. 7-298074

SUMMARY OF THE INVENTION

An object of the present invention is to discriminate whether or not a document is a generation document with high degree of accuracy compared to the conventional methods.

According to one aspect of the invention, a document type discriminating apparatus includes a screen pattern detection portion for detecting a type of a screen pattern used in an image captured by reading a document, and a document discrimination portion for discriminating that the document is a duplicate based on a result of discrimination as to whether or not the type of the screen pattern detected by the screen pattern detection portion is a line screen.

According to another aspect of the invention, a document type discriminating apparatus includes a period change detection portion for detecting a change in a period of a screen used in an image captured by reading a document, and a document discrimination portion for discriminating that the document is a duplicate based on a result of discrimination as to whether or not a value indicating the change in the period of the screen detected by the period change detection portion exceeds a predetermined value.

According to other aspect of the invention, a document type discriminating apparatus includes a sharpness detection portion for detecting sharpness of an edge seen in an image captured by reading a document, and a document discrimination portion for discriminating that the document is a duplicate based on a result of discrimination as to whether or not a value indicating the sharpness of the edge detected by the sharpness detection portion is lower than a predetermined value.

According to still other aspect of the invention, a document type discriminating apparatus includes a blur detection portion for detecting a blur in a color of an edge seen in an image captured by reading a document, and a document discrimination portion for discriminating that the document is a duplicate based on a result of discrimination as to whether or not a value indicating the blur in the color of the edge detected by the blur detection portion exceeds a predetermined value.

It is also possible to combine a plurality of the detection portions mentioned above. For example, the four detection portions are combined and when at least two out of the four detection results are true, the document is discriminated as a duplicate.

The present invention further includes a method for discriminating a type of a document, and a computer program product having a computer-readable medium and computer program contained on the computer-readable medium.

These and other characteristics and objects of the present invention will become more apparent by the following descriptions of embodiments with reference to drawings.

BRIEF DESCRIPTION OF THE DRAWING

FIG. 7 is a flowchart for explaining an example of detection processing of a screen pattern.

FIGS. 8A-8C show examples of an isolated point.

FIG. 9 is a diagram indicating a pixel name of each pixel shown in FIG. 8.

FIG. 10 is a flowchart for explaining an example of discrimination processing of a type of screen pattern.

DESCRIPTION OF THE PREFERRED EMBODIMENTS

Figure 1:
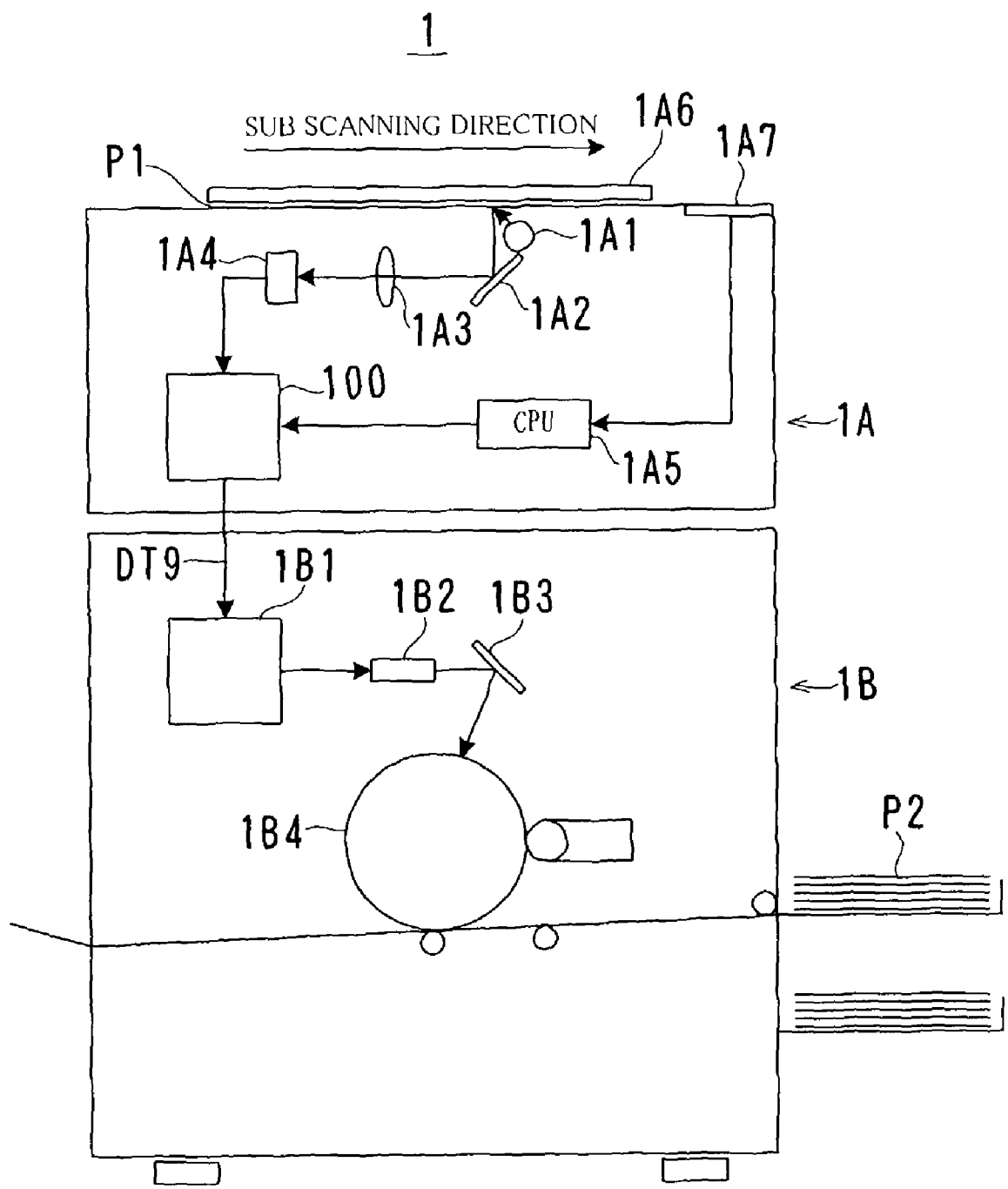
FIG. 1 shows an example of a general structure of a digital color copier.

FIG. 1 shows an example of a general structure of a digital color copier 1. Referring to FIG. 1, the digital color copier 1 includes an image capture device 1A and an image-recording device 1B. The image capture device 1A includes a light source 1A1, a mirror 1A2, a lens 1A3, a CCD (charge-coupled device) 1A4, a CPU 1A5, a document set glass 1A6, a control panel 1A7 and an image processor 100 having a function of discriminating a type of document according to the present invention.

A document P1 put on the document set glass 1A6 is irradiated with a light emitted from the light source 1A1 and, the light reflected from the document surface focuses upon the CCD 1A4, which is a linear image sensor, via a reduction optical system including the mirror 1A2 and the lens 1A3. The CCD 1A4 performs color separation, photoelectric conversion and charge transfer so that an image of the document P1 is converted into analog signals. In other words, the image capture device 1A scans the document image. The CCD 1A4 has resolution of 400 dpi and maximum document size is A3 (11.7 in×16.5 in), for example. In this case, one line in the main scanning direction has 5,000 dots.

The CCD 1A4 outputs the analog signals to the image processor 100. The image processor 100 converts the analog signals into digital data and, then, performs image processing such as reduction, enlargement or image enhancement that is described hereinafter. The processed digital data are output from the image capture device 1A to the image-recording device 1B as digital image data DT9.

The scanning operation for capturing the image of the document P1 is carried out in the main scanning direction and in the sub scanning direction, the main scanning direction being the arrangement direction of elements constituting the CCD 1A4, i.e., the longitudinal direction of the CCD 1A4, and the sub scanning direction being the direction vertical to the main scanning direction. Image signals are transmitted sequentially for each line in the main scanning direction.

The control panel 1A7 is used for setting enlargement copy or reduction copy, paper size, copy quantity, resolution and document mode. The setting information input by the control panel 1A7 is transferred to the CPU 1A5. The CPU 1A5 controls each part of the image capture device 1A and the image-recording device 1B based on the received information.

The image-recording device 1B includes a laser diode drive unit 1B1, a laser diode 1B2, a polygon mirror 1B3 and a photoconductor drum 1B4.

The image-recording device 1B converts the digital image data DT9 output from the image capture device 1A into analog signals at the laser diode drive unit 1B1, converts the analog signals into light intensity at the laser diode 1B2, and then makes the light focus upon the photoconductor drum 1B4 via the polygon mirror 1B3. Current input to the laser diode 1B2 is controlled and the amount of light of the laser diode 1B2 is controlled for each pixel. Thereby, a latent image is formed on the photoconductor drum 1B4 to be developed using toner so that the image is transferred to a sheet of paper P2. Thus, an image having resolution of 400 dpi and 256 gradation levels is formed using the electrophotographic method.

Figure 2:
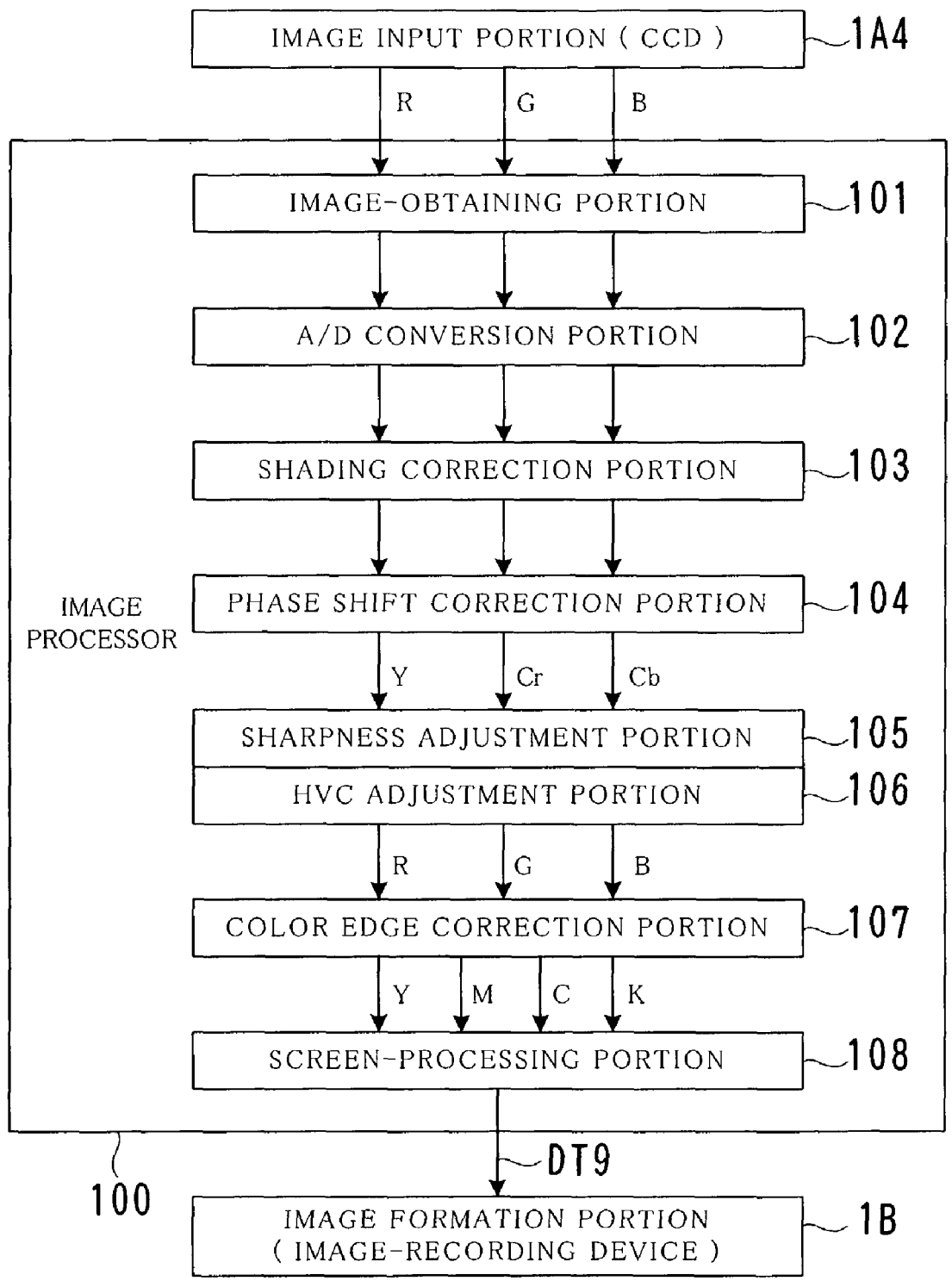
FIG. 2 is a block diagram showing an example of a structure of an image processor.
Figure 3:
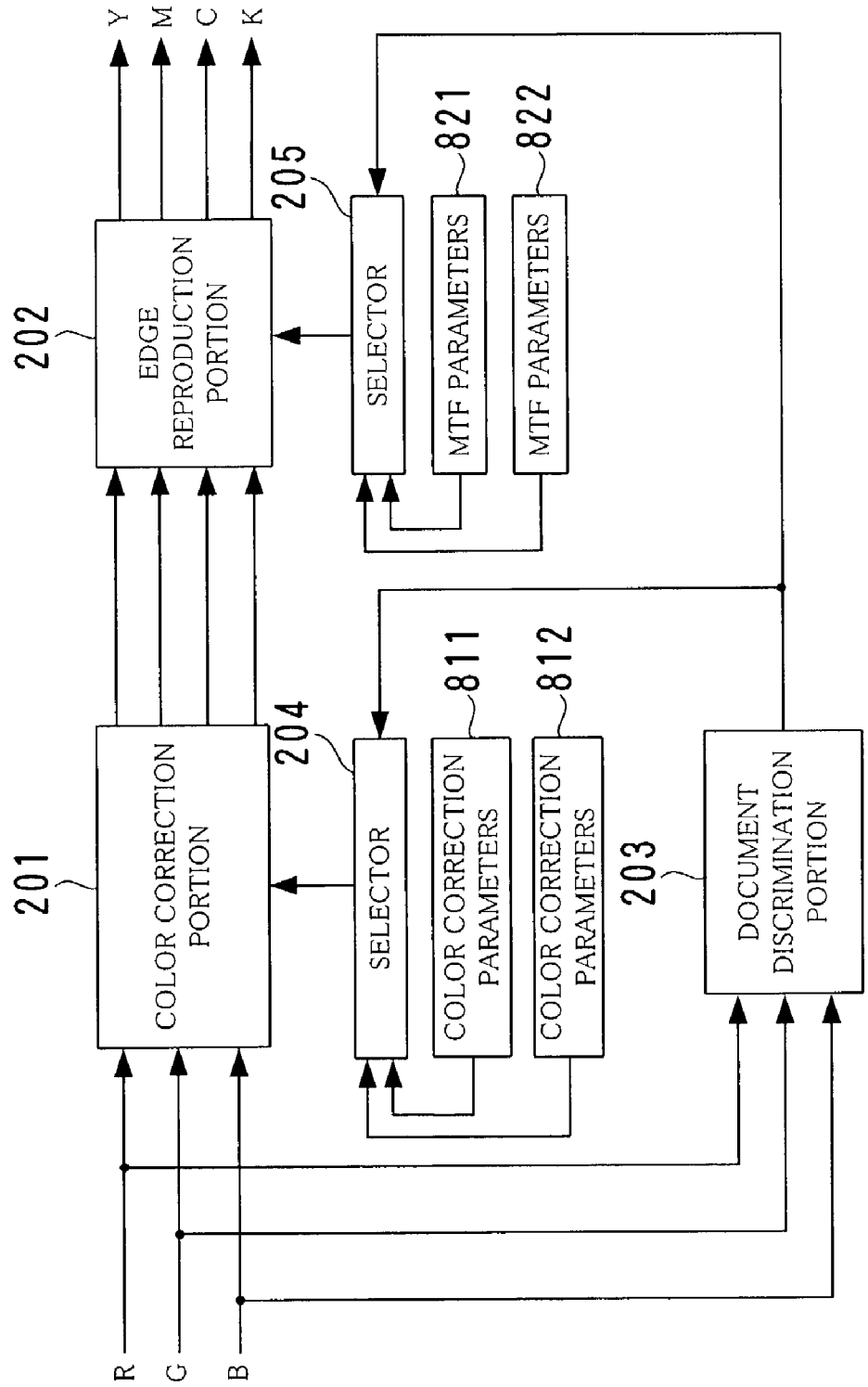
FIG. 3 is a block diagram showing an example of a structure of a color edge correction portion.
Figure 4:
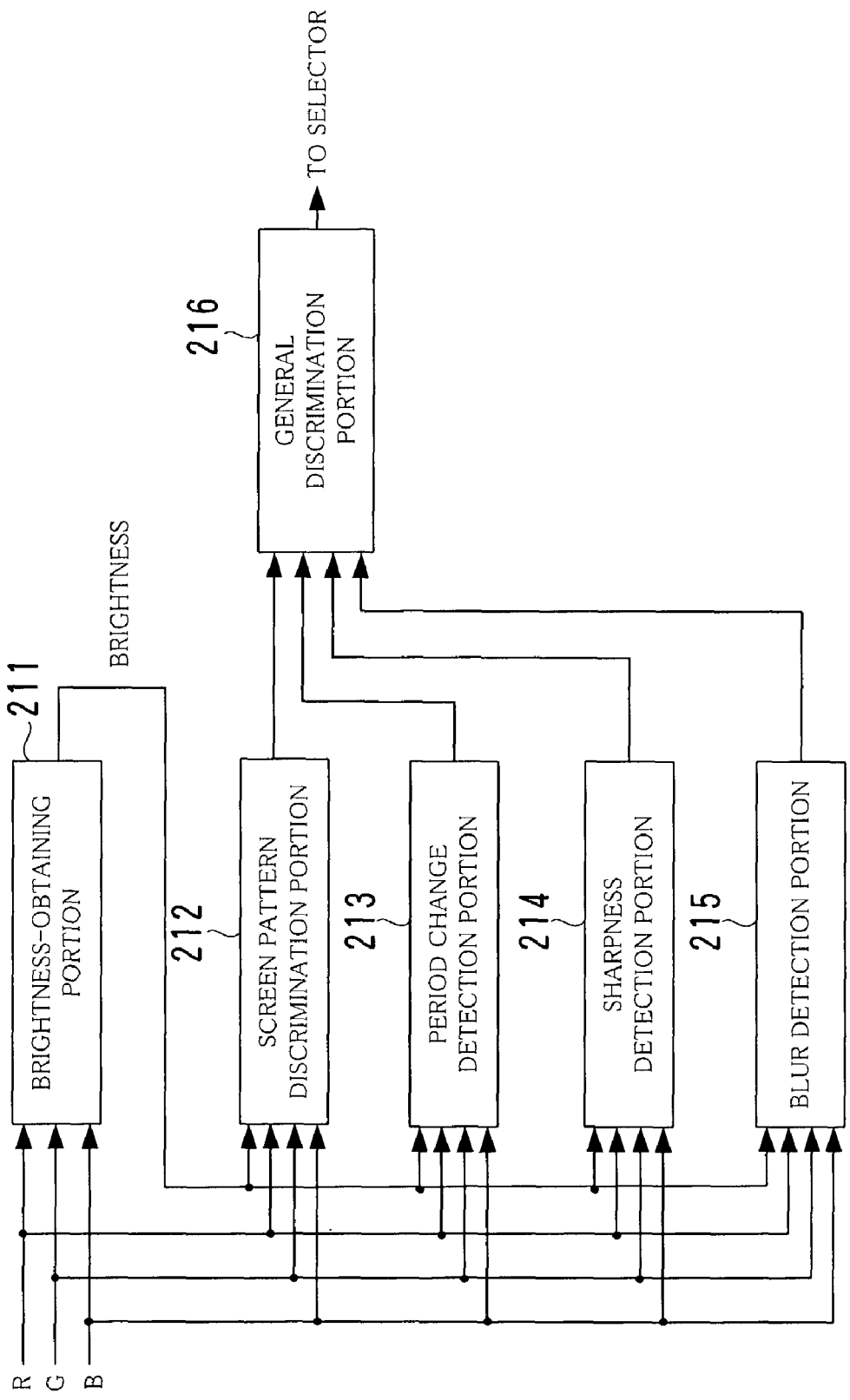
FIG. 4 is a block diagram showing an example of a structure of a document discrimination portion.
Figure 5:
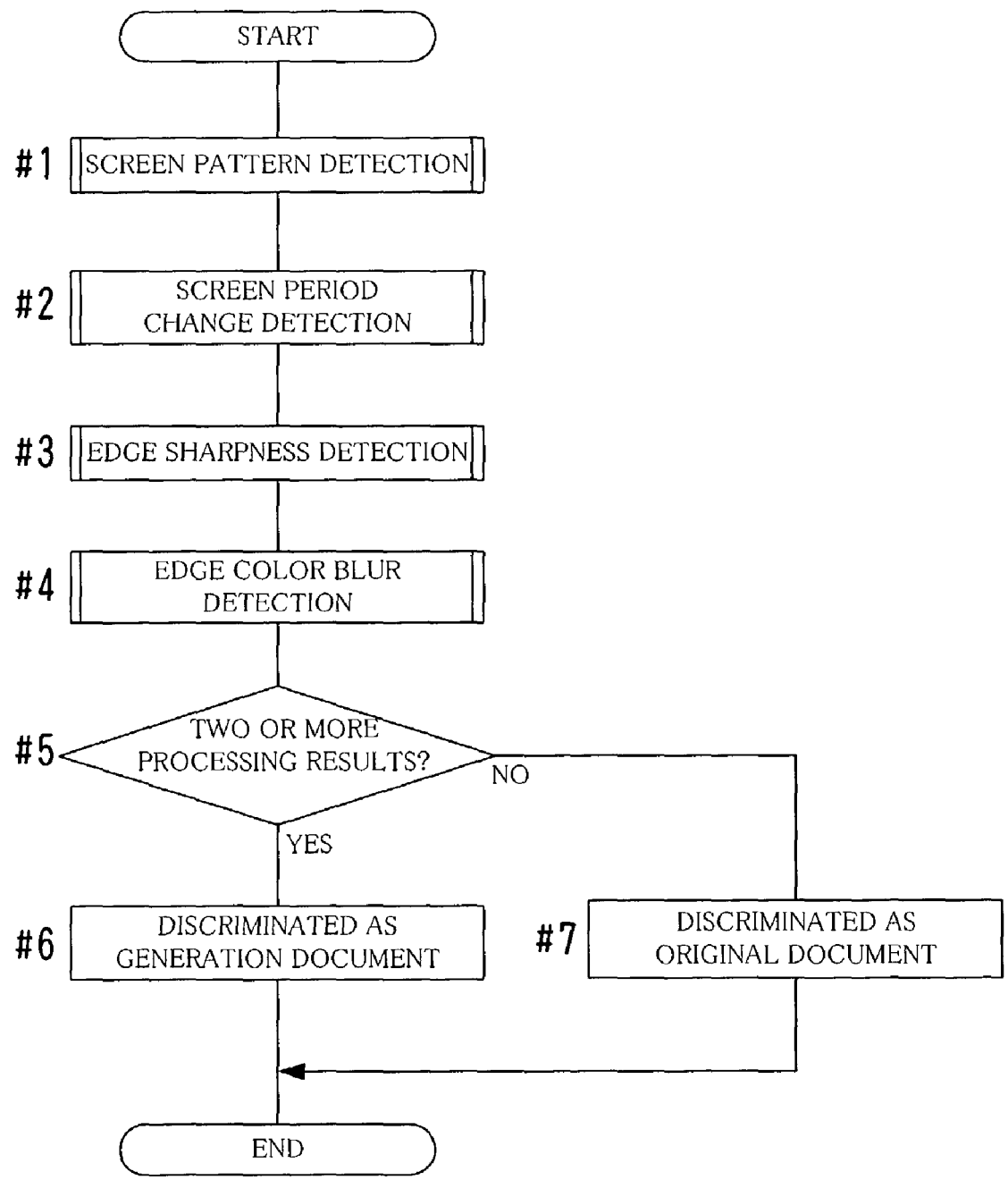
FIG. 5 is a flowchart for explaining an example of discrimination processing of a type of document in the document discrimination portion.

FIG. 2 is a block diagram showing an example of a structure of the image processor 100, FIG. 3 is a block diagram showing an example of a structure of a color edge correction portion 107, FIG. 4 is a block diagram showing an example of a structure of a document discrimination portion 203 and FIG. 5 is a flowchart for explaining an example of discrimination processing of a type of a document P1 by the document discrimination portion 203.

As shown in FIG. 2, the image processor 100 includes an image-obtaining portion 101, an A/D conversion portion 102, a shading correction portion 103, a phase shift correction portion 104, a sharpness adjustment portion 105, an HVC adjustment portion 106, a color edge correction portion 107 and a screen-processing portion 108.

The image-obtaining portion 101 obtains the analog signals output from the CCD 1A4, i.e., the color image signals of red, green and blue, all of the red, green and blue colors being additive primary colors. The A/D conversion portion 102 converts the red, green and blue image signals into red, green and blue image data, each of which is 8-bit digital data (density data of 256 gradation levels). The shading correction portion 103 performs shading correction for the obtained red, green and blue image data, the shading correction being the correction of non-uniform scanning, ex., variations in sensitivity of each pixel of a CCD and uneven light distribution. The red, green and blue image data subjected to the shading correction are input to the phase shift correction portion 104.

The phase shift correction portion 104 corrects phase shifts of the red, green and blue image signals (data) due to position shifts among the red line, the green line and the blue line of the CCD 1A4. For example, a field memory is used to delay the red and green image data for the correction. Further, the phase shift correction portion 104 corrects phase shifts of the corrected red, green and blue image data due to chromatic aberration of a lens system. The red, green and blue image data subjected to these corrections are converted into image data indicating brightness (Y) and color differences (Cr, Cb).

The sharpness adjustment portion 105 performs adjustment processing of sharpness (sharpness adjustment) or adjustment processing of smoothness (smoothing adjustment) of the image of the document P1. More specifically, when the brightness (Y) indicated in the image data input from the phase shift correction portion 104 is a predetermined value or less, the sharpness adjustment is so performed that the sharpness is higher depending on the low level of the brightness. Conversely, when the brightness (Y) is the predetermined value or more, the smoothing adjustment is so performed that the smoothness is higher depending on the brightness level. The HVC adjustment portion 106 adjusts hue and saturation of the image of the document P1 by multiplying the color differences (Cr, Cb) by a coefficient.

The data indicating the brightness (Y) and the color differences (Cr, Cb) of the image of the document P1, the image being adjusted by the sharpness adjustment portion 105 and the HVC adjustment portion 106, are converted into red, green and blue image data to be input to the color edge correction portion 107.

Referring to FIG. 3, the color edge correction portion 107 includes a color correction portion 201, an edge reproduction portion 202, a document discrimination portion 203, selectors 204 and 205, color correction parameters 811 and 812, and MTF parameters 821 and 822. The color edge correction portion 107 performs color correction processing and edge reproduction processing for the image of the document P1 depending on a type of the document P1.

The color correction portion 201 generates color image data of YMCK system (subtractive color system) based on the color image data of RGB system, that is, color space correction (conversion) from RGB system to YMCK system is performed. Color correction parameters to be used in this case depend on a type of the document P1. For example, the color correction parameters 811 are used when the document P1 is an original document, while the color correction parameters 812 are used when the document P1 is a generation document.

The "Generation document" in the present embodiments means a document whose image is captured by an image sensor or others to be reproduced, i.e., a copied document. The generation document may be sometimes referred to as a "generation copy". A document whose image is photographed by a digital camera to be printed by a printer (electrophotography) is included in the "generation document" in the present embodiments. On the contrary, a document that is not reproduced electronically, i.e., a document generated by printing is called an "original document". An analog picture and a handwritten document correspond to the original document.

The edge reproduction portion 202 performs edge reproduction of the color image data of YMCK system of the image on the document P1, i.e., processing such as edge enhancement. For example, an edge of a black character or a black line is discriminated in the image and edge enhancement is performed for the discriminated area. MTF parameters to be used on this occasion depend on a type of the document P1, similar to the case of the color correction parameters.

As shown in FIG. 4, the document discrimination portion 203 includes a brightness-obtaining portion 211, a screen pattern discrimination portion 212, a period change detection portion 213, a sharpness detection portion 214, a blur detection portion 215 and a general discrimination portion 216. The document discrimination portion 203 performs processing for discriminating whether the document P1 is a generation document or an original document.

Such discrimination processing is performed by steps shown in a flowchart of FIG. 5. Referring to FIG. 5, it is discriminated whether the document P1 is likely to be an original document or a generation document for each processing shown in steps #1-#4. If it is shown that the document P1 is likely to be a generation document in two or more out of the four processing results (the discrimination results) (Yes in #5), it is determined that the document P1 is a generation document (#6). If not shown, it is determined that the document P1 is an original document (#7). Each structure of the document discrimination portion 203 shown in FIG. 4 and the processing contents in each of the steps shown in FIG. 5 are described below.

The brightness-obtaining portion 211 shown in FIG. 4 finds brightness of the image of the document P1 based on the red, green and blue image data input from the color edge correction portion 107 (See FIG. 2). Brightness data indicating the brightness and the red, green and blue image data are input to the screen pattern discrimination portion 212 through the blur detection portion 215, respectively.

Figure 6:
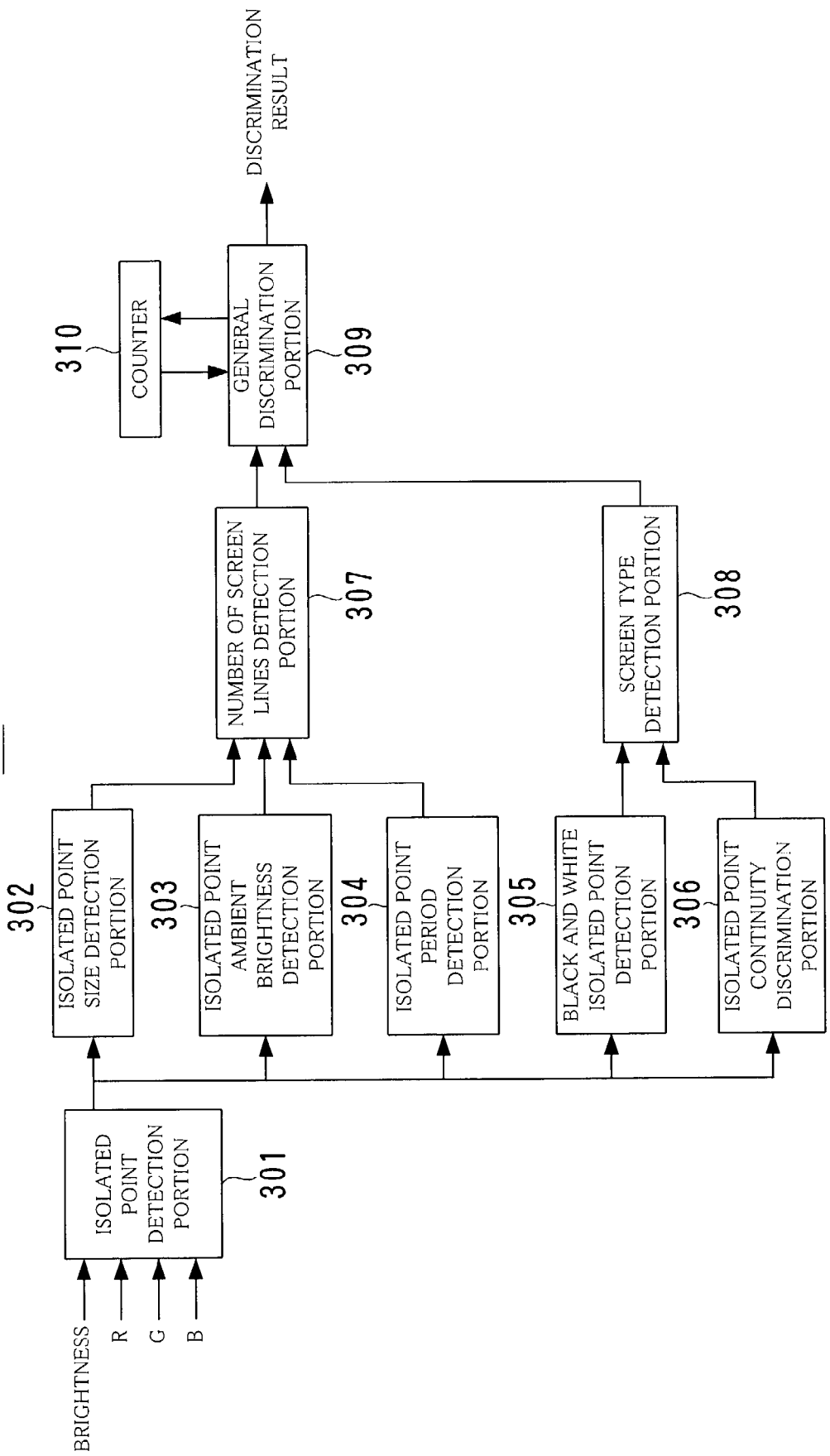
FIG. 6 is a block diagram showing an example of a structure of a screen pattern discrimination portion.
Figure 11A:
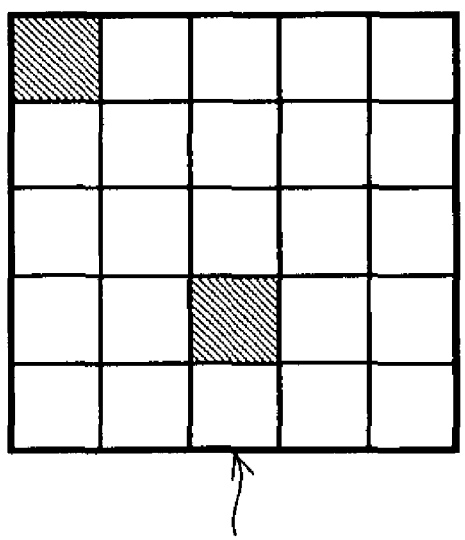
FIGS. 11A and 11B show examples of appearance of an isolated point.
Figure 11B:
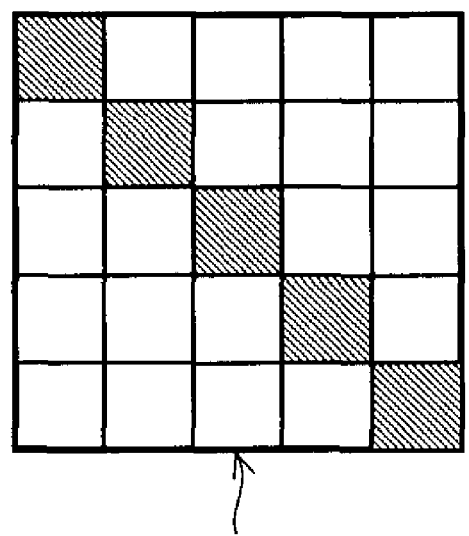
Figure 12:
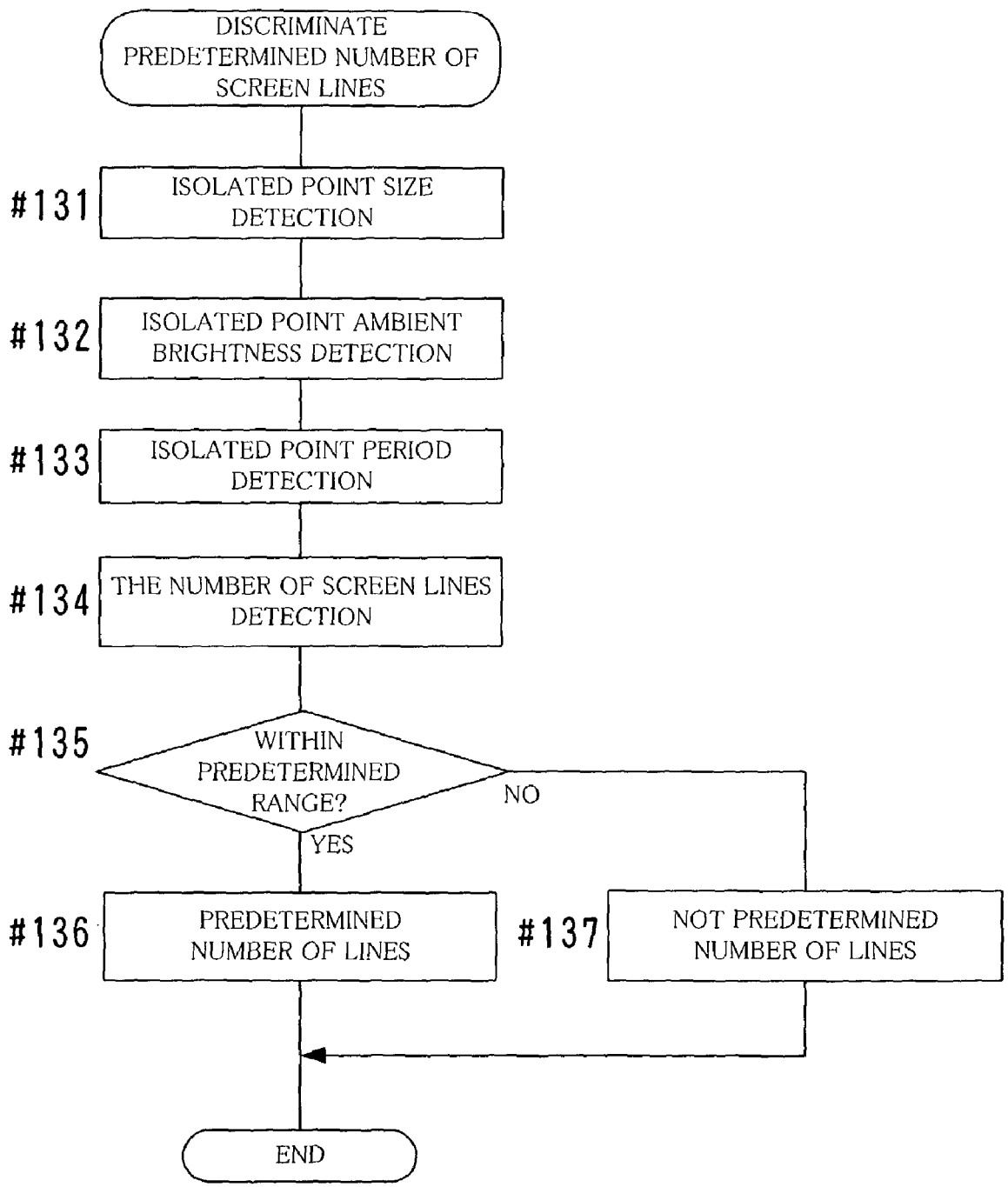
FIG. 12 is a flowchart for explaining an example of discrimination processing of a predetermined number of screen lines.
Figure 13:
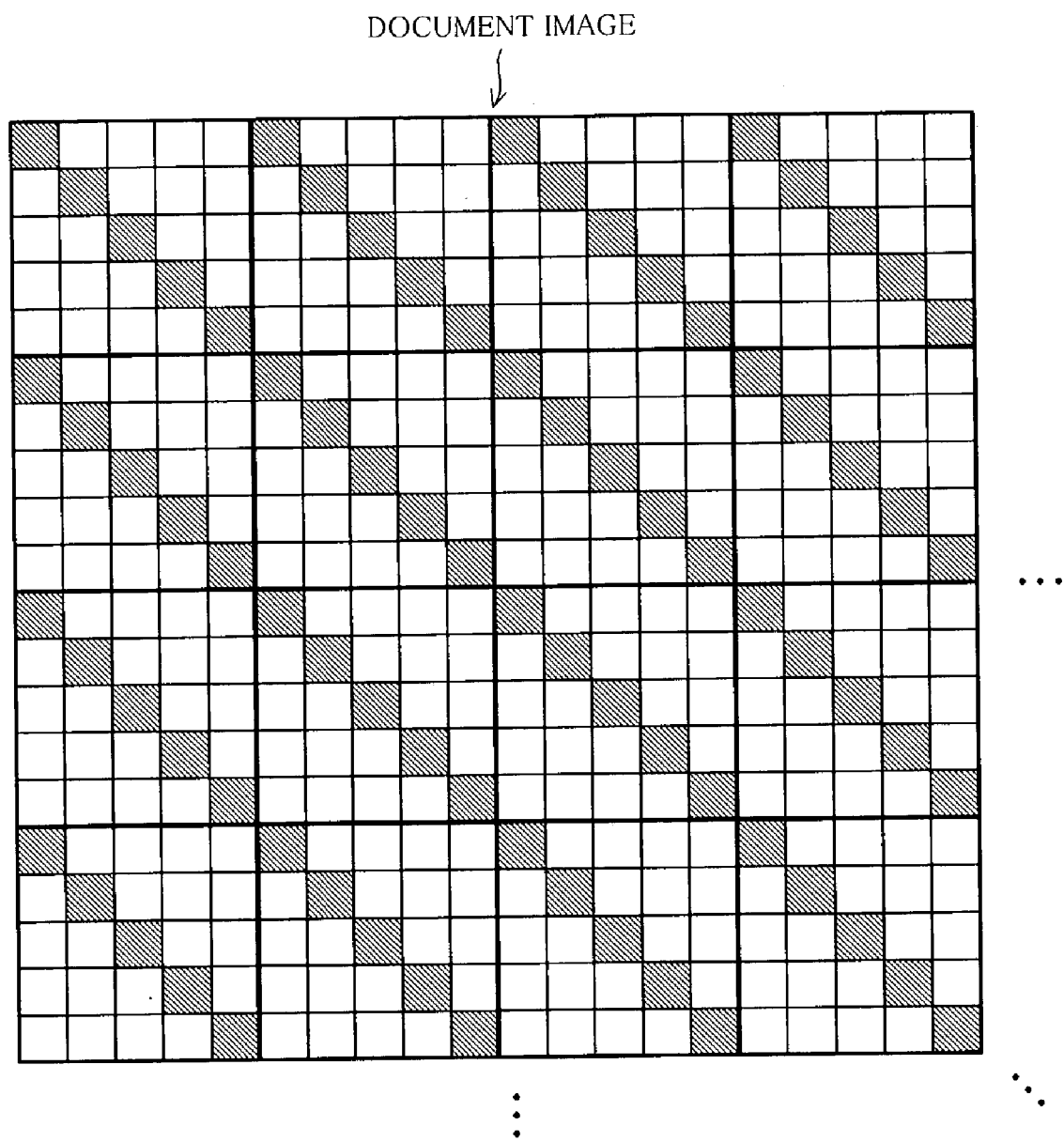
FIG. 13 is a diagram for explaining an example of a period of isolated point appearance.

FIG. 6 is a block diagram showing an example of a structure of the screen pattern discrimination portion 212, FIG. 7 is a flowchart for explaining an example of detection processing of a screen pattern, FIGS. 8A-8C show examples of an isolated point, FIG. 9 is a diagram indicating a pixel name of each of the pixels shown in FIG. 8, FIG. 10 is a flowchart for explaining an example of discrimination processing of a type of screen pattern, FIGS. 11A and 11B show examples of appearance of the isolated point, FIG. 12 is a flowchart for explaining an example of discrimination processing of a predetermined number of screen lines and FIG. 13 is a diagram for explaining an example of a period of isolated point appearance.

Referring to FIG. 6, the screen pattern discrimination portion 212 shown in FIG. 4 includes an isolated point detection portion 301, an isolated point size detection portion 302, an isolated point ambient brightness detection portion 303, an isolated point period detection portion 304, a black and white isolated point detection portion 305, an isolated point continuity discrimination portion 306, a number of screen lines detection portion 307, a screen type detection portion 308, a general discrimination portion 309 and a counter 310. The screen pattern discrimination portion 212 discriminates (detects) whether the screen pattern of the document P1 is closer to a screen pattern of a generation document or to a screen pattern of an original document (#1 in FIG. 5). Such discrimination processing is performed by steps shown in FIG. 7.

The isolated point detection portion 301 converts the image of the document P1 into a black and white binary image to divide the converted image into areas, each of which having a predetermined size (an area with 5×5 pixels, for example), and then to detect one or more isolated points within each of the areas (#101 in FIG. 7). The "isolated point" in the present embodiments means one pixel (dot) or a group (set) of continuous pixels having a value different from that of the surrounding pixels (dots). The "isolated point" herein includes an isolated point having one pixel shown in FIG. 8A and an isolated point having plural continuous pixels shown in FIGS. 8B and 8C. In FIGS. 8A-8C, "0" represents white, while "1" represents black. Other isolated points are also possible, in which 0 and 1 shown in FIGS. 8A-8C are reversed. Hereinafter, in an area having 5×5 pixels shown in FIG. 9, when the relationship of inequality (1) mentioned below is satisfied, the isolated point may be referred to as a "white isolated point", and when the relationship of inequality (2) mentioned below is satisfied, the isolated point may be referred to as a "black isolated point".

Brightness of a pixel $D33$>Brightness $Yv$ of pixels surrounding the pixel $D33+\alpha$     (1)

Brightness of a pixel $D33$<Brightness $Yv$ of pixels surrounding the pixel $D33+\alpha$     (2)

In the inequalities (1) and (2), the brightness Yv equals the average brightness of pixels D11-D15, D21, D25, D31, D35, D41 and D51-55, and a denotes an offset value.

Next, a type of screen pattern is discriminated for each of division areas (areas into which the image of the document P1 is divided), each area having a predetermined size (#102 in FIG. 7). The black and white isolated point detection portion 305, the isolated point continuity discrimination portion 306 and the screen type detection portion 308 that are shown in FIG. 6 perform such discrimination processing by steps shown in FIG. 10.

Based on the inequalities (1) and (2), the black and white isolated point detection portion 305 discriminates whether the isolated point detected by the isolated point detection portion 301 is a white isolated point or a black isolated point (#121 in FIG. 10). In other words, the black and white isolated point detection portion 305 detects a white isolated point and a black isolated point.

When the isolated point is a black isolated point (Yes in #122), the isolated point continuity discrimination portion 306 discriminates (detects) a pattern of appearance of the isolated point (#123). In the present embodiments, it is discriminated whether each of the isolated points appears apart when viewed as a whole, as shown in FIG. 11A, for example, or the isolated point appears linearly, as shown in FIG. 11B, for example. That is, continuity of isolated point appearance (each of the isolated points is apart or the isolated point is continuous like a line) is discriminated. The screen type detection portion 308 determines an area having the former pattern of the isolated points as a "dot screen" (No in #124, and #126), and an area having the latter pattern (continuity pattern) of the isolated point as a "line screen" (Yes in #124, and #125).

Referring to FIG. 7, the number of screen lines is detected for each division area of the image of the document P1 (#103). The isolated point size detection portion 302, the isolated point ambient brightness detection portion 303, the isolated point period detection portion 304 and the number of screen lines detection portion 307 that are shown in FIG. 6 perform such detection processing by steps shown in FIG. 12.

The isolated point size detection portion 302 detects the size of the isolated point detected by the isolated point detection portion 301 (#131 in FIG. 12). The isolated point ambient brightness detection portion 303 detects the average brightness of a predetermined area surrounding the isolated point (#132). The average brightness of a 5×5 pixels area including the isolated point is detected, for example. The isolated point period detection portion 304 detects a period (an interval) of isolated point appearance (#133). In the case of an image shown in FIG. 13, it is detected that an isolated point appears once in five times, i.e., every five dots. The processing order of the steps #131-#133 may be modified as required, or these steps may be performed in parallel.

The number of screen lines detection portion 307 detects the number of screen lines seen in each predetermined area (a 5×5 area, for example) of the image of the document P1 based on the processing results of the isolated point size detection portion 302, the isolated point ambient brightness detection portion 303 and the isolated point period detection portion 304 (#134).

As a period of isolated point appearance is shorter, the calculated number of screen lines is larger. Smaller size of the isolated point provides finer screen pattern. Therefore, the calculated number of screen lines is larger even if the period of isolated point appearance is the same. Further, the number of isolated points depends on the brightness. Accordingly, an isolated point per unit area of a screen line (dot gain) is determined with reference to the average brightness of the predetermined area around the isolated point. Based on these relationships, the number of screen lines is determined.

The number of screen lines detection portion 307 discriminates whether or not the number of screen lines is within a predetermined range, i.e., whether or not "threshold level (ref1)>the number of screen lines>threshold level (ref2)" is satisfied (#135, #136 and #137).

Referring to FIG. 7, when it is determined that the number of screen lines in a predetermined area is within the predetermined range, and that the area is a "line screen" (Yes in #104), "1" is added to the counter 310 shown in FIG. 6 (#105). Processing of steps #101-#105 is repeated for all areas (No in #106).

If the value stored in the counter 310 is a predetermined value or more, i.e., if a line screen is seen and the predetermined number of screen lines is seen in a region larger than a predetermined area (Yes in #107), the general discrimination portion 309 discriminates that the screen pattern of the document P1 is close to a screen pattern of a generation document and, therefore, the document P1 is likely to be a generation document (#108). Otherwise (No in #107), it is discriminated that the screen pattern of the document P1 is close to a screen pattern of an original document and, therefore, the document P1 is likely to be an original document (#109).

Generally, a dot screen is commonly used in a printed document that is not reproduced electronically, while a line screen is commonly used in electrophotography or a duplicate provided by xerography. Therefore, such a discrimination method is possible.

Figure 14:
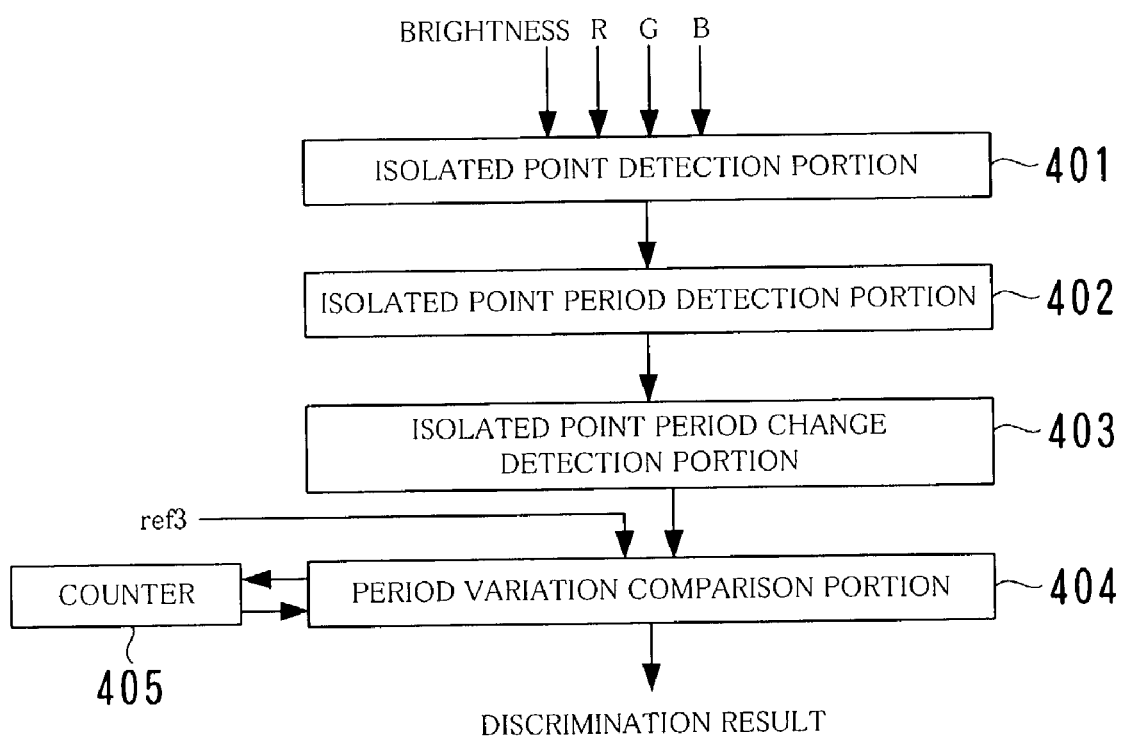
FIG. 14 is a block diagram showing an example of a structure of a period change detection portion.
Figure 15:
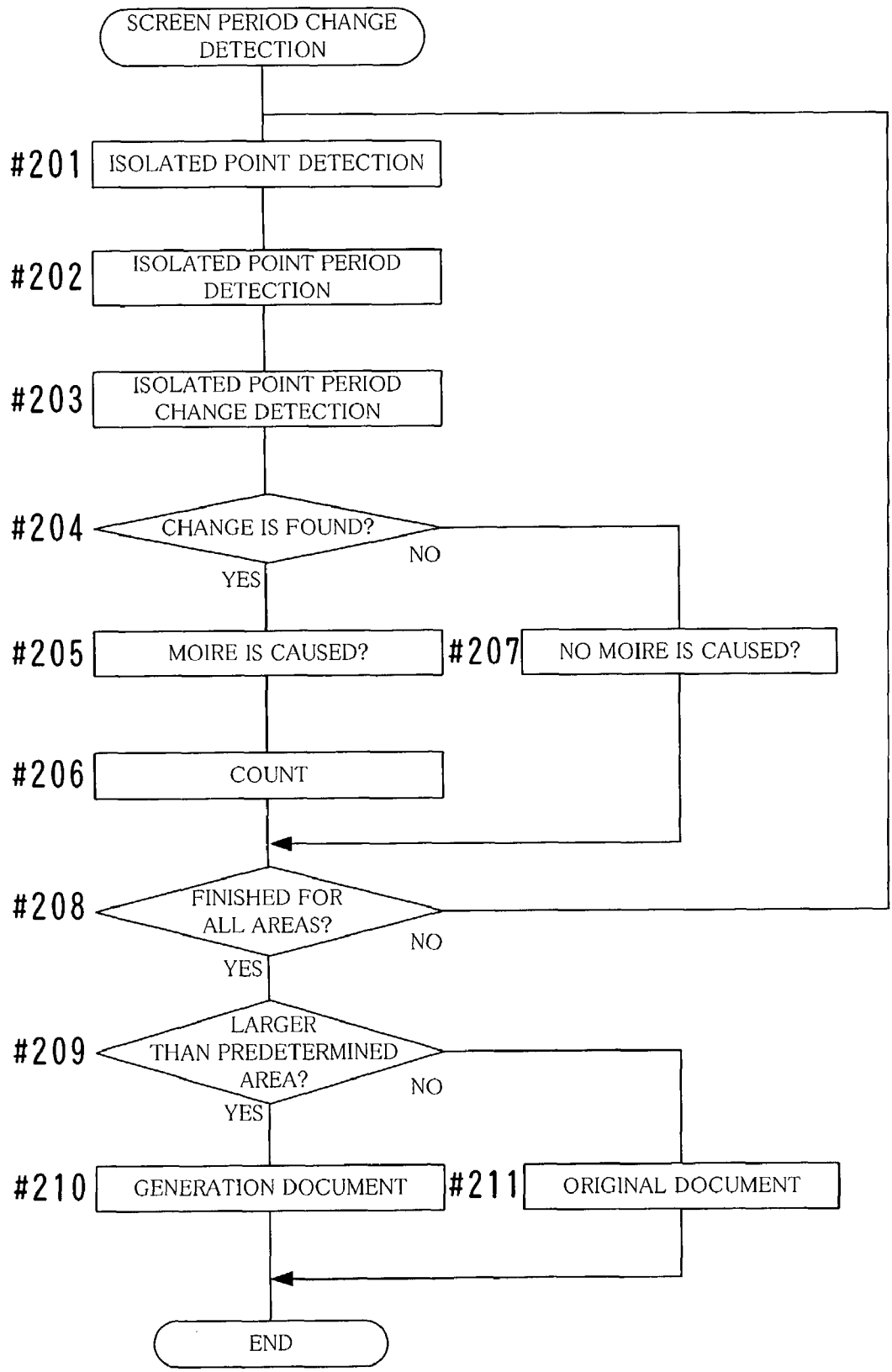
FIG. 15 is a flowchart for explaining an example of detection processing of a screen period change.
Figure 16:
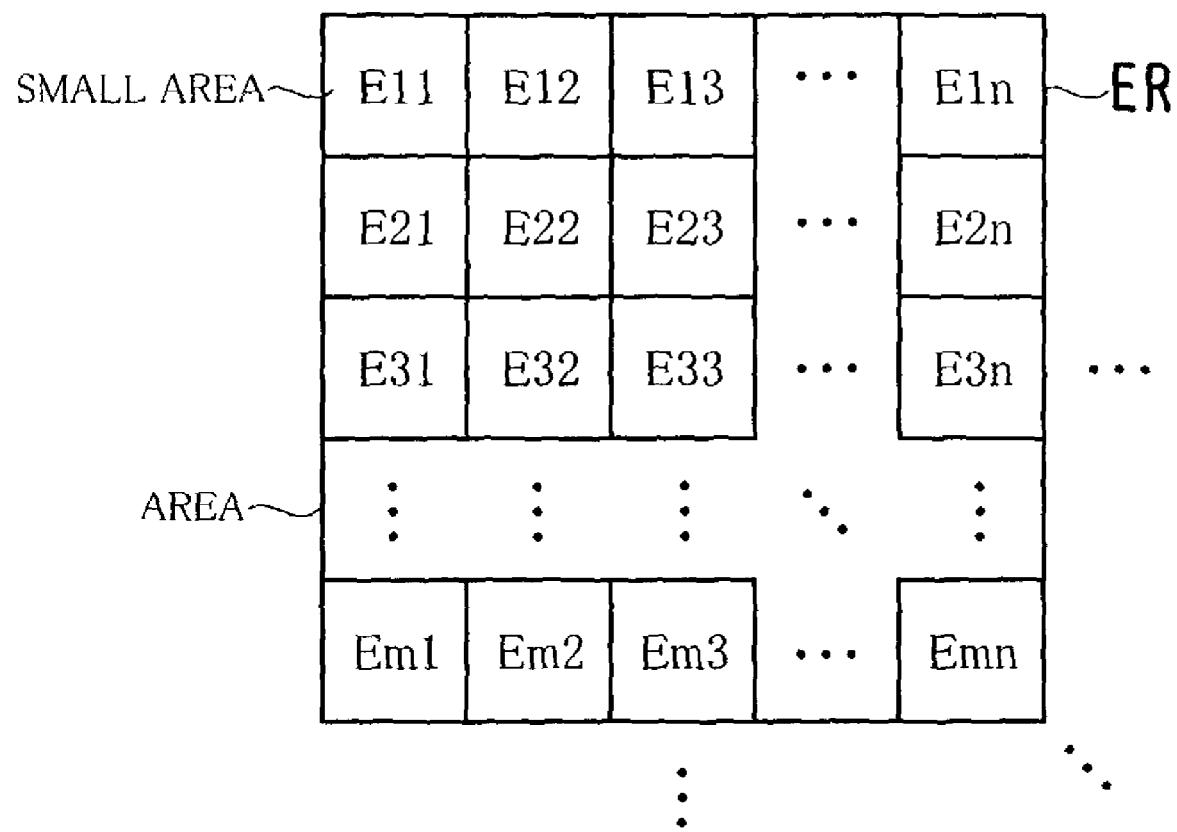
FIG. 16 shows a relationship between an area with a certain size and small areas into which the former area is divided.

FIG. 14 is a block diagram showing an example of a structure of the period change detection portion 213, FIG. 15 is a flowchart for explaining an example of detection processing of a screen period change and FIG. 16 shows a relationship between an area with a certain size and small areas into which the former area is divided.

As shown in FIG. 14, the period change detection portion 213 in FIG. 4 includes an isolated point detection portion 401, an isolated point period detection portion 402, an isolated point period change detection portion 403, a period variation comparison portion 404 and a counter 405. The period change detection portion 213 detects whether a change (variation or deviation) is found in a period of screen line appearance and discriminates whether the document P1 is closer to an original document or to a generation document (#2 in FIG. 5). Such processing is performed by steps shown in FIG. 15.

The isolated point detection portion 401 in FIG. 14 detects an isolated point within each of the areas in the image of the document P1 (#201 in FIG. 15), similar to the isolated point detection portion 301 shown in FIG. 6. The isolated point period detection portion 402 detects a period of isolated point appearance for each small area (division area) of the image of the document P1 (#202), similar to the isolated point period detection portion 304 shown in FIG. 6. These detection results are input to the isolated point period change detection portion 403. Instead of provision of the isolated point detection portion 401 and the isolated point period detection portion 402, the period change detection portion 213 may be so structured that the detection results of the isolated point detection portion 301 and the isolated point period detection portion 304 are input to the isolated point period change detection portion 403.

The isolated point period change detection portion 403 detects a degree of change (time lag) in a period of screen line appearance (#203). Based on the detection result, the period variation comparison portion 404 discriminates whether a change is found in a period of screen line appearance (#204). Such processing is performed as follows, for example.

Referring to FIG. 16, an area ER with a certain size (an area with 100×100 pixels, for example) of the image of the document P1 is divided into plural small areas (division areas) E11, E12 . . . Emn. Each of the plural division areas has one or more isolated points. The isolated point period change detection portion 403 selects the maximum value and the minimum value among frequencies of isolated point appearance in each of the small areas, the frequencies being obtained by the isolated point period detection portion 402.

The period variation comparison portion 404 compares the difference between the maximum value and the minimum value, and a predetermined value (ref3). When the comparison result is ref3 or more, it is discriminated that a change is found in isolated point appearance in the area ER (period) (Yes in #204). In this case, it is discriminated that moiré is caused on the image in the area ER (#205), and "1" is added to the counter 405 (#206). When the comparison result is not ref3 or more (No in #204), it is discriminated that no changes are found and no moiré is caused (#207).

With respect to each of other areas ER of the image of the document P1, discrimination processing is repeated whether or not a change is found in a period of isolated point appearance (No in #208 and #201-#207). As a result, if the value stored in the counter 405 is a predetermined value or more, i.e., if it is discriminated that a change is found in a period of isolated point appearance in a region larger than a predetermined area of the image of the document P1 (Yes in #209), it is determined that the document P1 is likely to be a generation document (#210). Otherwise (No in #209), it is determined that the document P1 is likely to be an original document (#211).

Generally, interference occurs in screen lines of an image of a duplicate (a generation document) due to plural frequency components, and thereby the screen lines turn out to appear unevenly. Accordingly, such a discrimination method is possible.

Figure 17:
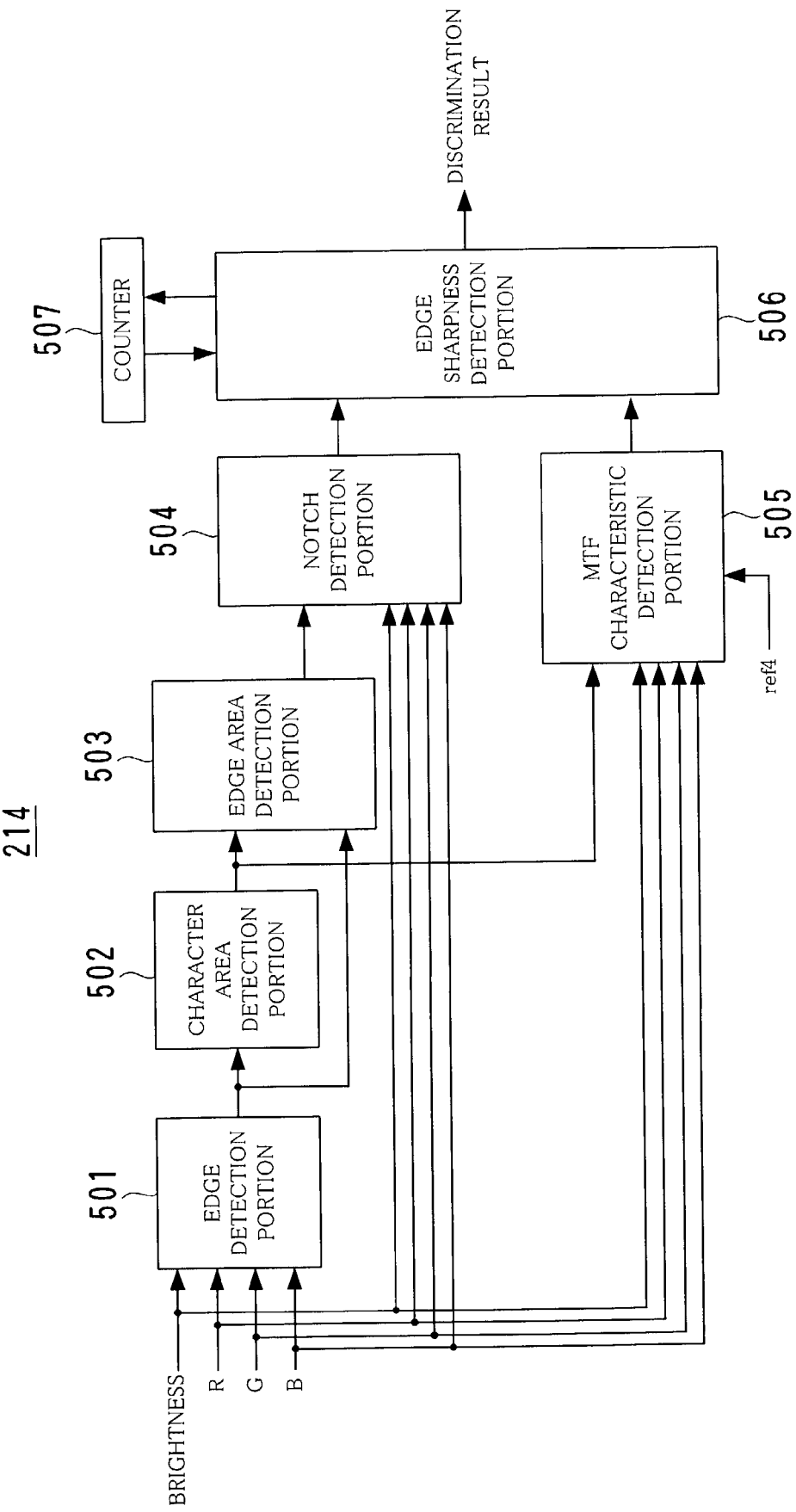
FIG. 17 is a block diagram showing an example of a sharpness detection portion.
Figure 18:
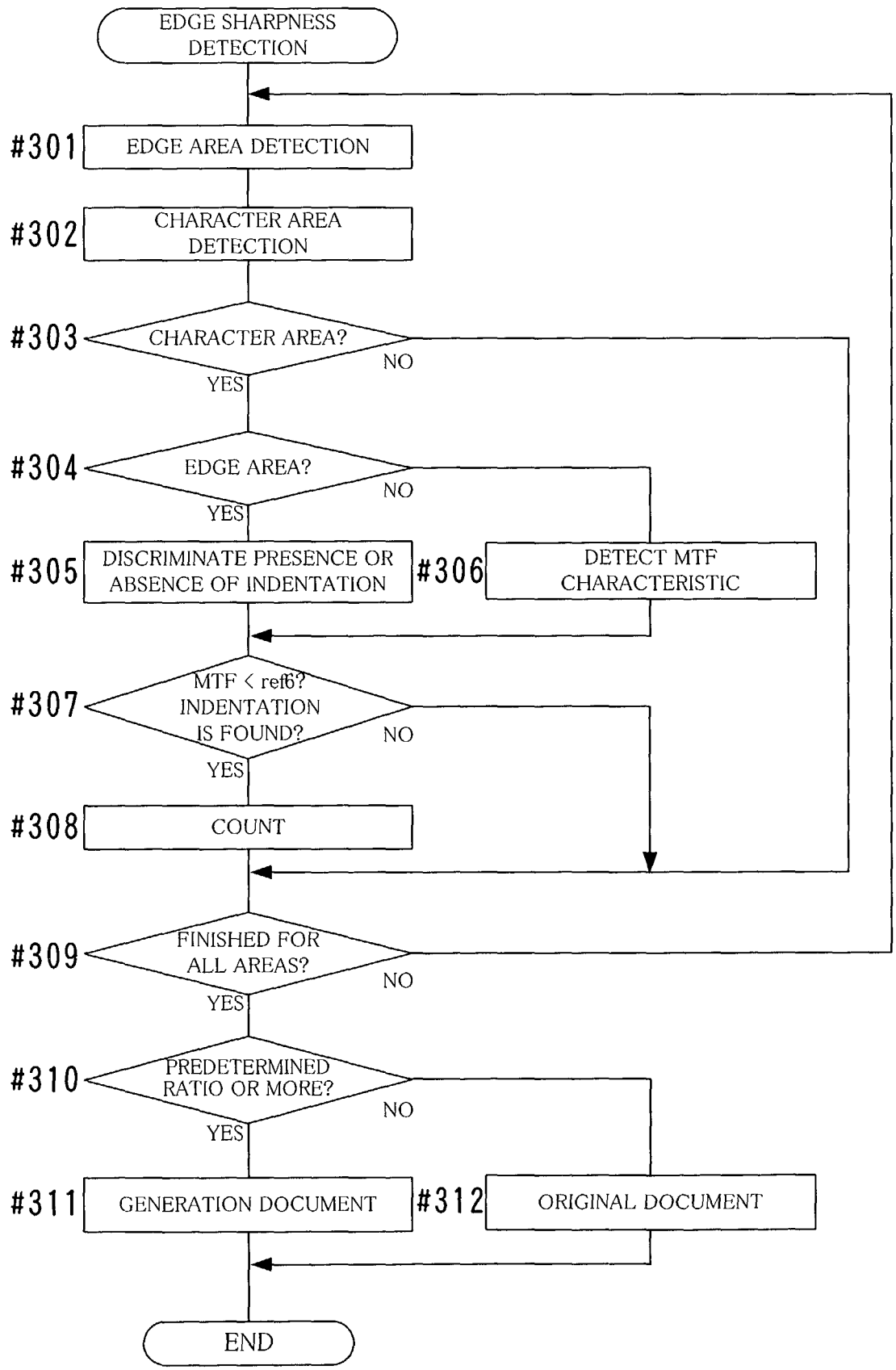
FIG. 18 is a flowchart for explaining an example of detection processing of edge sharpness.

FIG. 17 is a block diagram showing an example of the sharpness detection portion 214 and FIG. 18 is a flowchart for explaining an example of detection processing of edge sharpness. Referring to FIG. 17, the sharpness detection portion 214 in FIG. 4 includes an edge detection portion 501, a character area detection portion 502, an edge area detection portion 503, a notch detection portion 504, an MTF characteristic detection portion 505, an edge sharpness detection portion 506 and a counter 507. The sharpness detection portion 214 determines sharpness of the image of the document P1 and thereby to discriminate whether the document P1 is closer to an original document or a generation document (#3 in FIG. 5). Such processing is performed by steps shown in FIG. 18.

The edge detection portion 501 detects an edge in the image of the document P1 (#301 in FIG. 18). The character area detection portion 502 detects a character area in the image of the document P1 based on the detected edge (#302). The "character area" in the present embodiments means an area where a numeric character or a symbol is written in addition to an area where an alphabet or other language characters are written.

When the detected edge is an edge of the character area (Yes in #303 and Yes in #304), the edge area detection portion 503 detects the edge portion thereof, i.e., the contour of the character. The notch detection portion 504 detects a notch (aliasing or indentation) of the edge portion of the detected character (#305).

The MTF characteristic detection portion 505 detects spatial frequency characteristic, i.e., MTF (modulation transfer function) characteristic of the interior portion of the character area detected by the character area detection portion 502 (No in #304, and #306).

The edge sharpness detection portion 506 adds "1" to the counter 507 (#308) when the notch detection portion 504 detects no notches in the character area, or when the notch detection portion 504 detects only a notch lower than a predetermined amount and further when the MTF characteristic of the character area is a predetermined value (ref6) or less (Yes in #307), the MTF characteristic of the character area being detected by the MTF characteristic detection portion 505.

Processing of the steps #301-#308 is repeated for all of the character areas of the image of the document P1 (No in #309). As a result, when the value stored in the counter 507 is a predetermined value (ref4) or more (Yes in #310), it is discriminated that the image of the document P1 is low in sharpness and the document P1 is likely to be a generation document (#311). When the value stored in the counter 507 is not the predetermined value (ref4) or more (No in #310), it is determined that the image of the document P1 is high in sharpness and the document P1 is likely to be an original document (#312).

Generally, aliasing easily occurs in the edge portion in a duplicate (a generation document) due to noise occurrence or digitalization of a document image. Therefore, such a discrimination method is possible.

Figure 19:
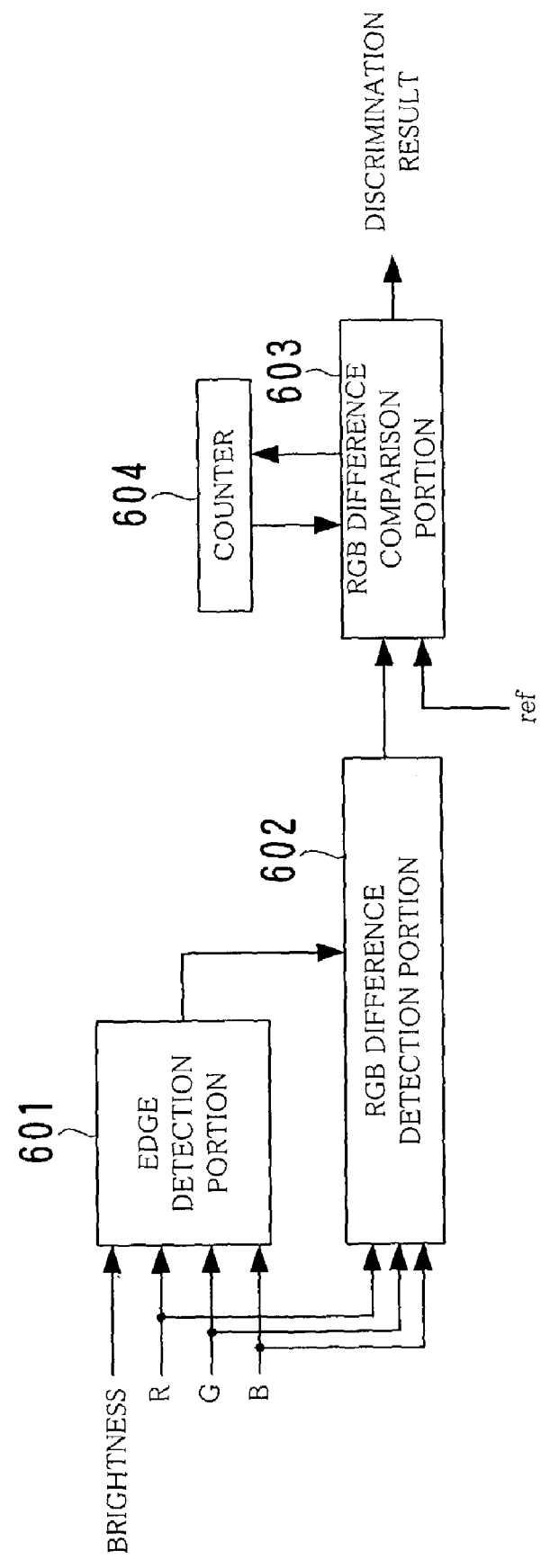
FIG. 19 is a block diagram showing an example of a blur detection portion.
Figure 20:
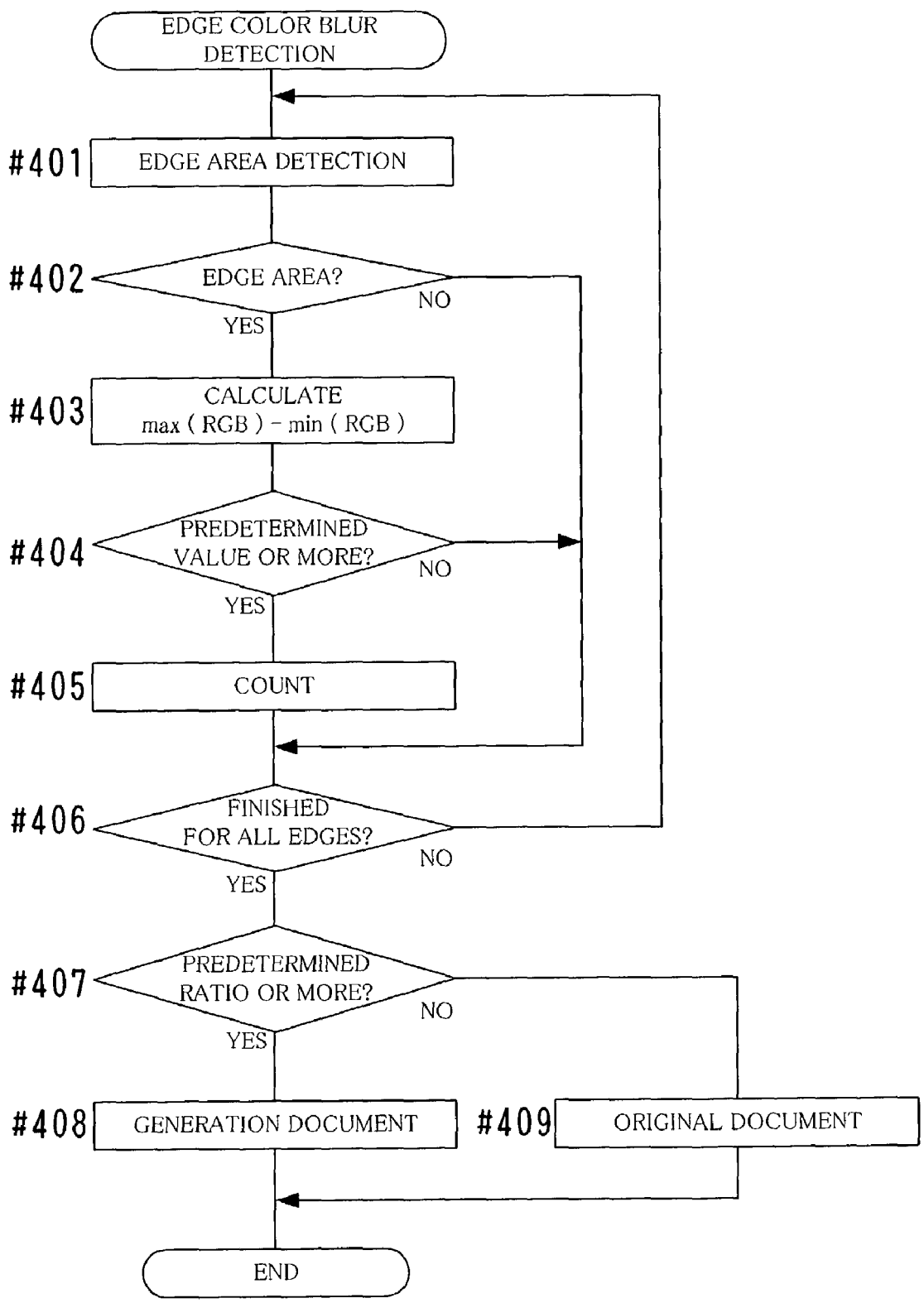
FIG. 20 is a flowchart for explaining an example of detection processing of an edge color blur.
Figure 21:
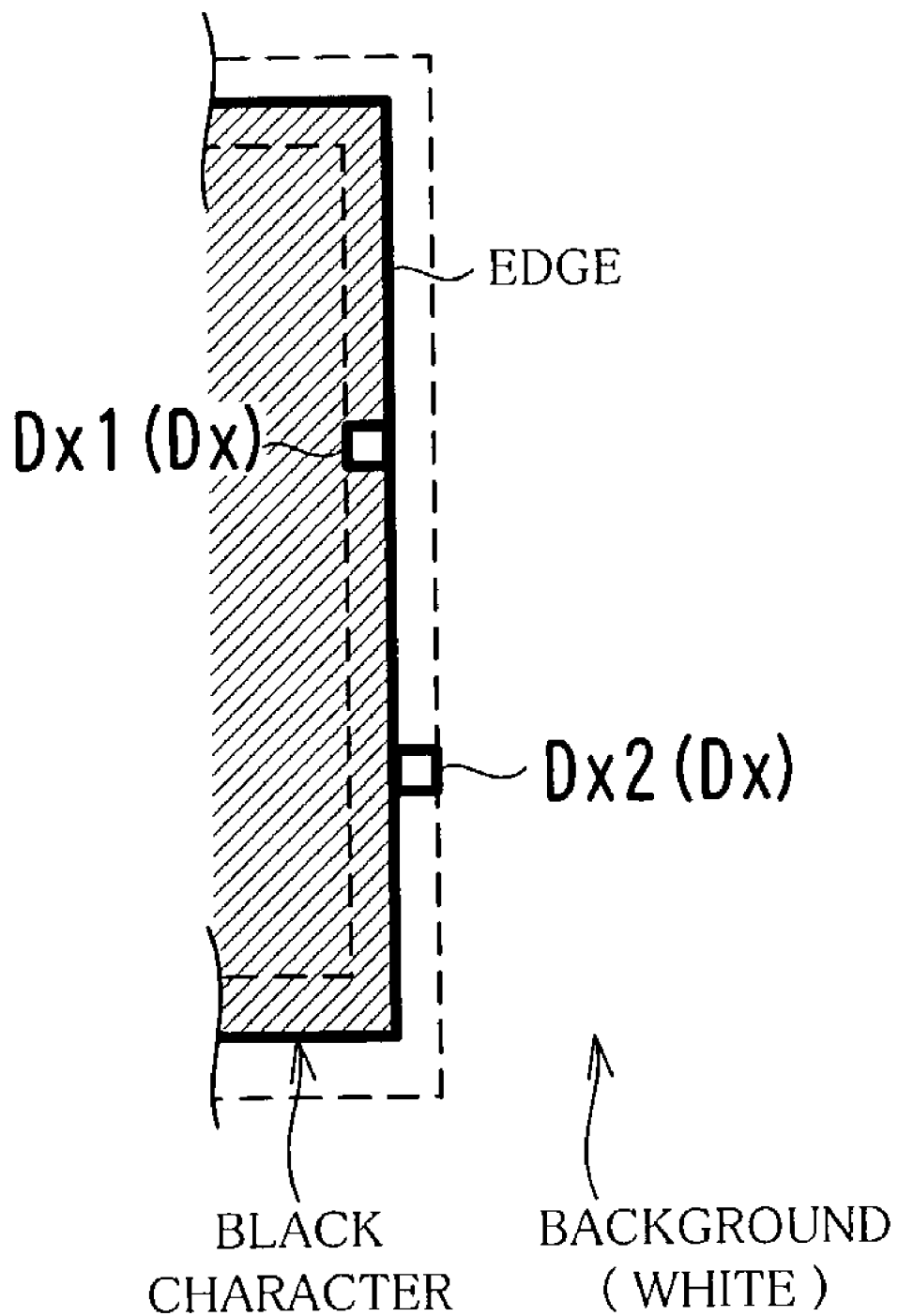
FIG. 21 shows a positional relationship among a character, a background and an edge.

FIG. 19 is a block diagram showing an example of the blur detection portion 215, FIG. 20 is a flowchart for explaining an example of detection processing of an edge color blur and FIG. 21 shows a positional relationship among a character, a background and an edge.

As shown in FIG. 19, the blur detection portion 215 in FIG. 4 includes an edge detection portion 601, an RGB difference detection portion 602, an RGB difference comparison portion 603 and a counter 604. The blur detection portion 215 detects whether or not a blur appears in the edge in the image of the document P1 and thereby to discriminate whether the document P1 is closer to an original document or a generation document (#3 in FIG. 5). Such processing is performed by steps shown in FIG. 20.

The edge detection portion 601 detects an edge area in the image of the document P1 (#401 in FIG. 20) similar to the edge detection portion 501 shown in FIG. 17. The detection results are output to the RGB difference detection portion 602. The color edge correction portion 107 may be so structured that the detection results of the edge detection portion 501 are output to the RGB difference detection portion 602.

With respect to each pixel in the detected edge area (adjacent to the detected edge) (Yes in #402), the RGB difference detection portion 602 detects (calculates) a left-hand side of the following inequality (3), i.e., an RGB difference based on each value of density of red, green and blue colors (gradation level) (#403). Then, the RGB difference comparison portion 603 discriminates whether or not the inequality (3) is satisfied (#404).

$$\max(RGB) - \min(RGB) > \text{ref5} \quad (3)$$

Here, $\max(RGB) = \max(Sr(\text{pixels Dx}), Sg(\text{pixels Dx}), Sb(\text{pixels}(Dx)))$, and $\min(RGB) = \min(Sr(\text{pixels Dx}), Sg(\text{pixels Dx}), Sb(\text{pixels}(Dx)))$. Further, pixels Dx mean pixels in an edge area. $Sr(\text{pixels Dx})$, $Sg(\text{pixels Dx})$ and $Sb(\text{pixels Dx})$ denote density of red, green and blue colors of the pixels Dx (256 gradation levels), respectively. $\max(a, b, \ldots)$ and $\min(a, b, \ldots)$ denote the maximum value and the minimum value of parameters $a, b, \ldots$, respectively. ref5 represents a predetermined value above zero (threshold level).

For example, in the case of a document image in which a black character is written on a white background as shown in FIG. 21, each value of Sr, Sg and Sb of a pixel Dx1 is ideally zero, the pixel Dx1 being on the inside of the edge, i.e., on the character side. Therefore, a left-hand side of the inequality (3) becomes zero so that the inequality (3) is not satisfied. Each value of Sr, Sg and Sb of a pixel Dx2 is ideally 255, the pixel Dx2 being on the outside of the edge, i.e., on the background side. Therefore, a left-hand side of the inequality (3) becomes zero so that the inequality (3) is not satisfied. Thus, when the document P1 is an original document, the inequality (3) is not satisfied in most cases.

Meanwhile, when the document P1 is a generation document, a blur appears on the edge and the inequality (3) is satisfied in most cases. For example, when cyan smudges the outside of the black character, i.e., the background, values of Sr, Sg and Sb of the pixel Dx2 are zero, 255 and 255, respectively. Therefore, a left-hand side of the inequality (3) becomes 255.

The RGB difference comparison portion 603 discriminates that a smudge appears on the pixel Dx if the inequality (3) is satisfied. If the number of pixels Dx determined to have a smudge out of the pixels Dx in the edge area is a predetermined number or more, it is determined that a smudge appears on the edge and "1" is added to the counter 604 (Yes in #404, and #405). Otherwise, it is determined that no smudges appear (No in #404). Processing of the steps #401-#405 is repeated for all edges in the image (No in #406).

If the value stored in the counter 604 is a predetermined value or more, i.e., if a smudge is detected in edge areas larger than a predetermined ratio (Yes in #407), it is determined that the document P1 is likely to be a generation document (#408). Otherwise (No in #407), it is determined that the document P1 is likely to be an original document (#409).

Referring to FIG. 4, the general discrimination portion 216 discriminates whether the document P1 is a generation document or an original document (#6 and #7) based on the processing results of the screen pattern discrimination portion 212 through the blur detection portion 215 (#1-#4 in FIG. 5). For example, when two or more out of these four processing results demonstrate that the document P1 is likely to be a generation document (Yes in #5), the general discrimination portion 216 determines that the document P1 is a generation document (#6). When two or more out of the four processing results do not demonstrate (No in #5), the general discrimination portion 216 determines that the document P1 is an original document (#7). Processing order of the steps #1-#4 may be modified as required. Alternatively, processing of the steps #1-#4 may be performed in parallel.

Referring to FIG. 3, the selector 204 selects one of the color correction parameters 811 and 812 based on the discrimination result of the general discrimination portion 216 in FIG. 4. More specifically, the selector 204 selects the color correction parameters 811 when the discrimination result is an original document, while the selector 204 selects the color correction parameters 812 when the discrimination result is a generation document. Likewise, the selector 205 selects the MTF parameters 821 when the discrimination result is an original document, while the selector 205 selects the MTF parameters 822 when the discrimination result is a generation document.

The color correction portion 201 performs color correction of the image of the document P1 using parameters selected by the selector 204, and the edge reproduction portion 202 performs edge reproduction of the image of the document P1 using parameters selected by the selector 205.

Referring to FIG. 2, the screen-processing portion 108 performs screen processing for the image of the document P1, the image being subjected to the color correction and the edge reproduction, in accordance with characteristics of the digital color copier 1 including characteristics of toner of each of YMCK, scanning characteristics and lens characteristics, and values set by the control panel 1A7 including resolution, magnification and a document mode.

The digital image data DT9 of the image of the document P1, the image being subjected to the processing described above, are transmitted to the image-recording device 1B as an image formation portion where an adjusted image of the document P1 is formed to be transferred onto a sheet of paper P2.

According to the present embodiments, a type of the document P1 is detected based on a screen pattern, variation in a period of isolated point appearance, sharpness of an edge portion and a blur in an edge color, thereby ensuring that a type of the document P1 can be discriminated with high degree of precision compared to the conventional methods.

In the embodiments described above, it is determined that the document P1 is a generation document when it is shown that the document P1 is likely to be a generation document in two or more out of four processing results of the screen pattern discrimination portion 212 through the blur detection portion 215 shown in FIG. 4. However, other discrimination methods can be adopted. For example, a criterion for discriminating that the document P1 is likely to be a generation document is set low in each of the screen pattern discrimination portion 212 through the blur detection portion 215. Then, it may be determined that the document P1 is a generation document when it is shown that the document P1 is likely to be a generation document in three or more out of four processing results. Alternatively, the possibility of being a generation document is converted into a score in each of the four processing and a type of the document may be determined based on the total score.

Processing of some parts or whole part of the image-obtaining portion 101 through the screen-processing portion 108 shown in FIG. 2 can be performed in a personal computer, a workstation or others. In this case, programs for executing the processing of the image-obtaining portion 101 through the screen-processing portion 108 are installed on a hard disk. The programs are loaded into a RAM as required to be executed by a CPU. An image of a document may be captured by a scanner unit via an interface such as RS-232C or USB, for example. The image subjected to the processing may be output using a display unit or a printer.

Figure 22:
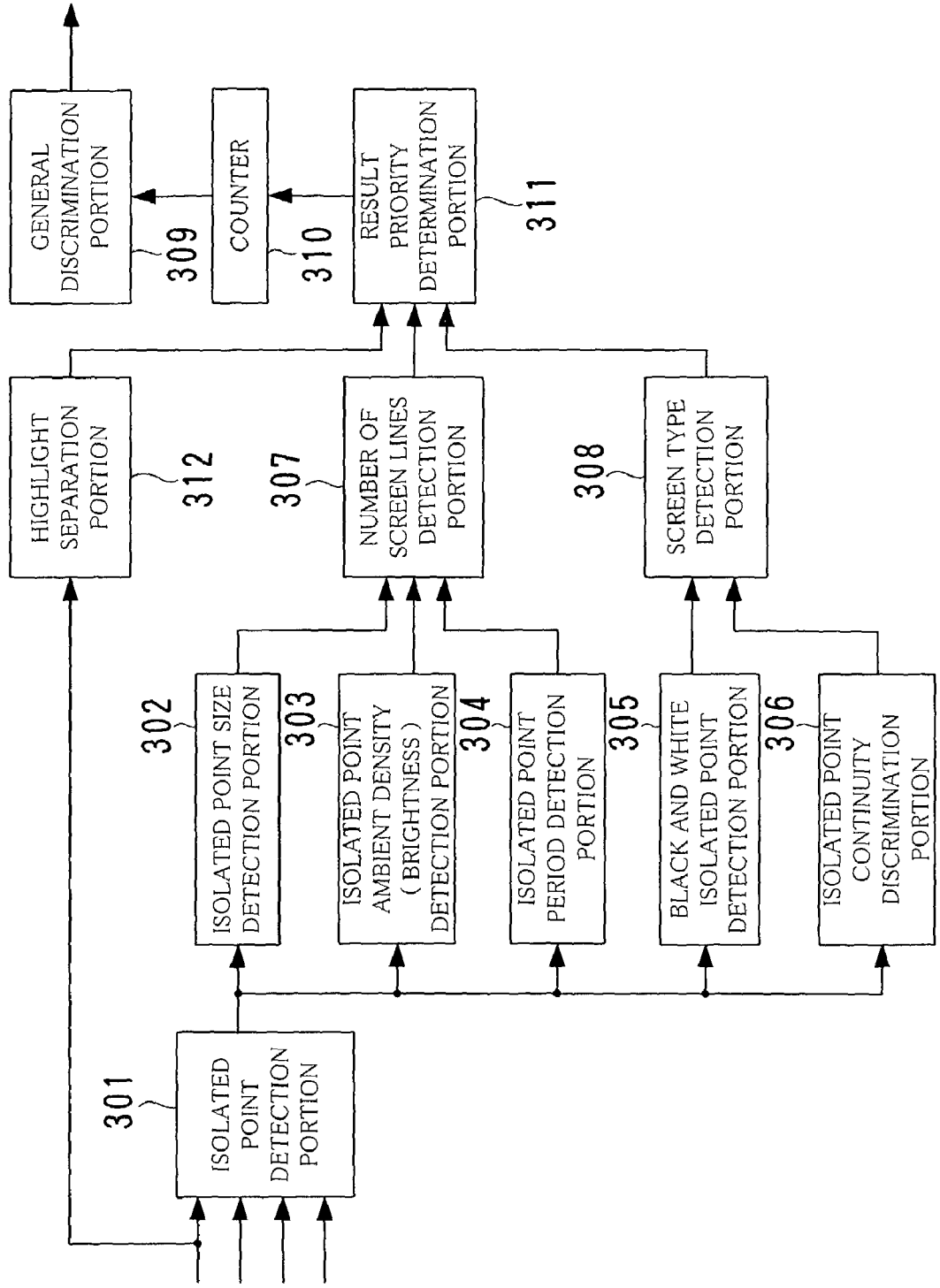
FIG. 22 is a block diagram showing a modification of the screen pattern discrimination portion.
Figure 23:
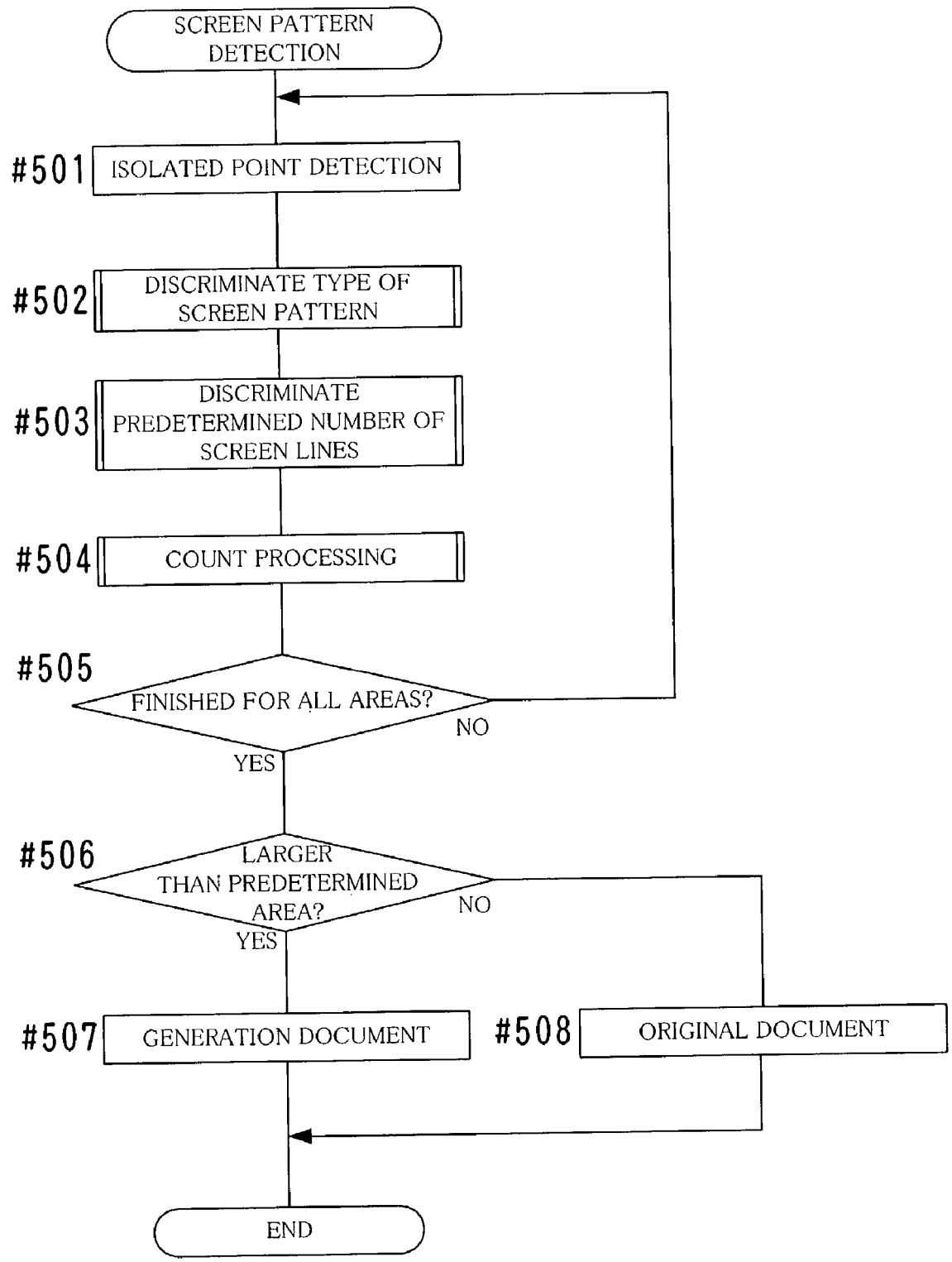
FIG. 23 is a flowchart for explaining an example of detection processing of a screen pattern when the screen pattern discrimination portion shown in FIG. 22 is applied.
Figure 24:
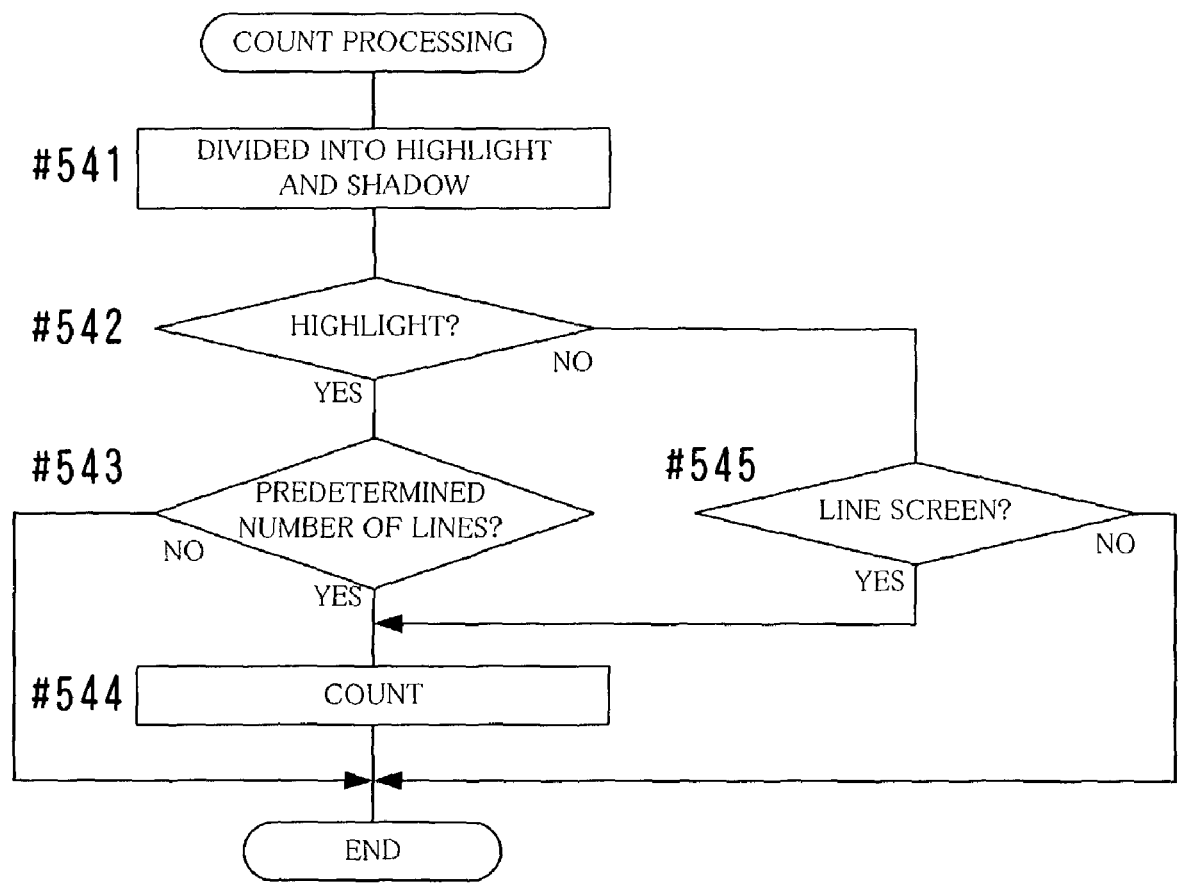
FIG. 24 is a flowchart for explaining an example of count processing.

FIG. 22 is a block diagram showing a modification of the screen pattern discrimination portion 212, FIG. 23 is a flowchart for explaining an example of detection processing of a screen pattern when the screen pattern discrimination portion 212 shown in FIG. 22 is applied and FIG. 24 is a flowchart for explaining an example of count processing.

The screen pattern discrimination portion 212 (see FIGS. 4 and 6) may be provided with a result priority determination portion 311 and a highlight separation portion 312 to perform processing that differs between a high brightness area (a highlight area) and a low brightness area (a shadow area) of the image of the document P1. On this occasion, processing may be performed by steps shown in FIG. 23.

Processing contents of steps #501-#503 shown in FIG. 23 are the same as that of the steps #101-#103 shown in FIG. 7. More specifically, the image of the document P1 is divided into areas, each of which having a predetermined size and, then, a type of screen pattern and the number of screen lines of each area are discriminated.

Count processing is performed in accordance with processing results of the steps #502 and #503 (#504). Such processing is performed by steps in FIG. 24. The highlight separation portion 312 in FIG. 22 discriminates whether a division area is a highlight area or a shadow area based on the brightness of the division area. More specifically, the image of the document P1 is divided into a highlight area and a shadow area (#541). For example, in the case of 256 gradation levels, an area having a brightness of 200 or more is defined as a highlight area, while an area having a brightness of 199 or less is defined as a shadow area.

When the division area is determined as the highlight area (Yes in #542), the result priority determination portion 311 determines so that processing result of the number of screen lines detection portion 307 is used for discrimination of a type of the document. In this case, when the area includes a predetermined number of screen lines (Yes in #543), "1" is added to the counter 310 (#544).

On the contrary, when the division area is determined as the shadow area (No in #542), the result priority determination portion 311 so determines that processing result of the screen type detection portion 308 is used for discrimination of a type of the document. In this case, when the screen pattern of the area is a line screen (Yes in #545), "1" is added to the counter 310 (#544).

Referring to FIG. 23, when the value stored in the counter 310 is a predetermined value or more (Yes in #506), the general discrimination portion 309 shown in FIG. 22 determines that the document P1 is likely to be a generation document (#507), similar to the processing of the steps #107-#109 in FIG. 7. When the value stored in the counter 310 is not the predetermined value or more (No in #506), the general discrimination portion 309 determines that the document P1 is likely to be an original document (#508).

The screen pattern discrimination portion 212 is structured as mentioned above, thereby it is possible to refer even the highlight area in discrimination of a type of the document P1, the highlight area being difficult to be discriminated whether the isolated point forms a line screen or a dot screen. Therefore, a type of the document can be discriminated with reliability.

Figure 25:
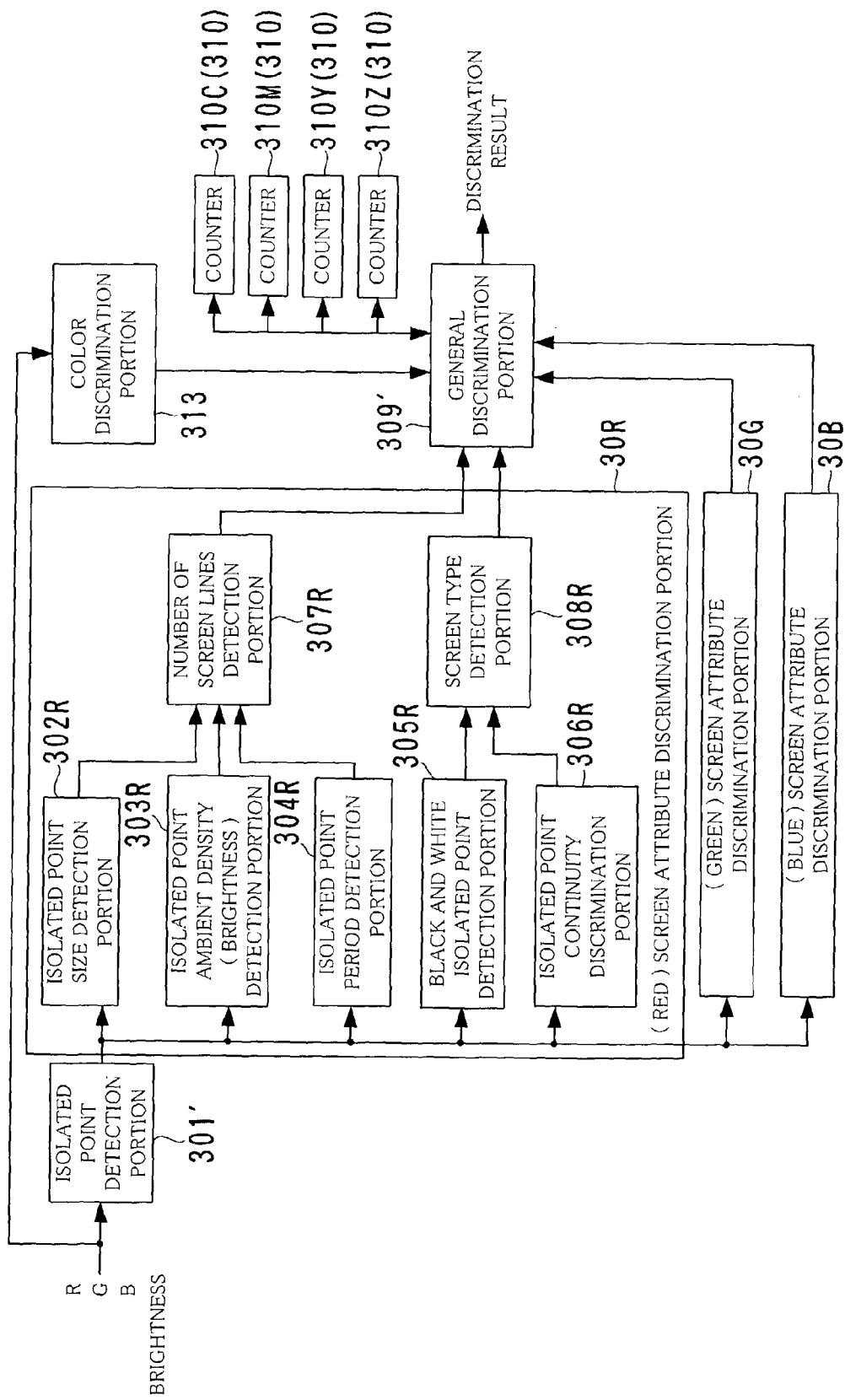
FIG. 25 is a block diagram showing a modification of the screen pattern discrimination portion.
Figure 26:
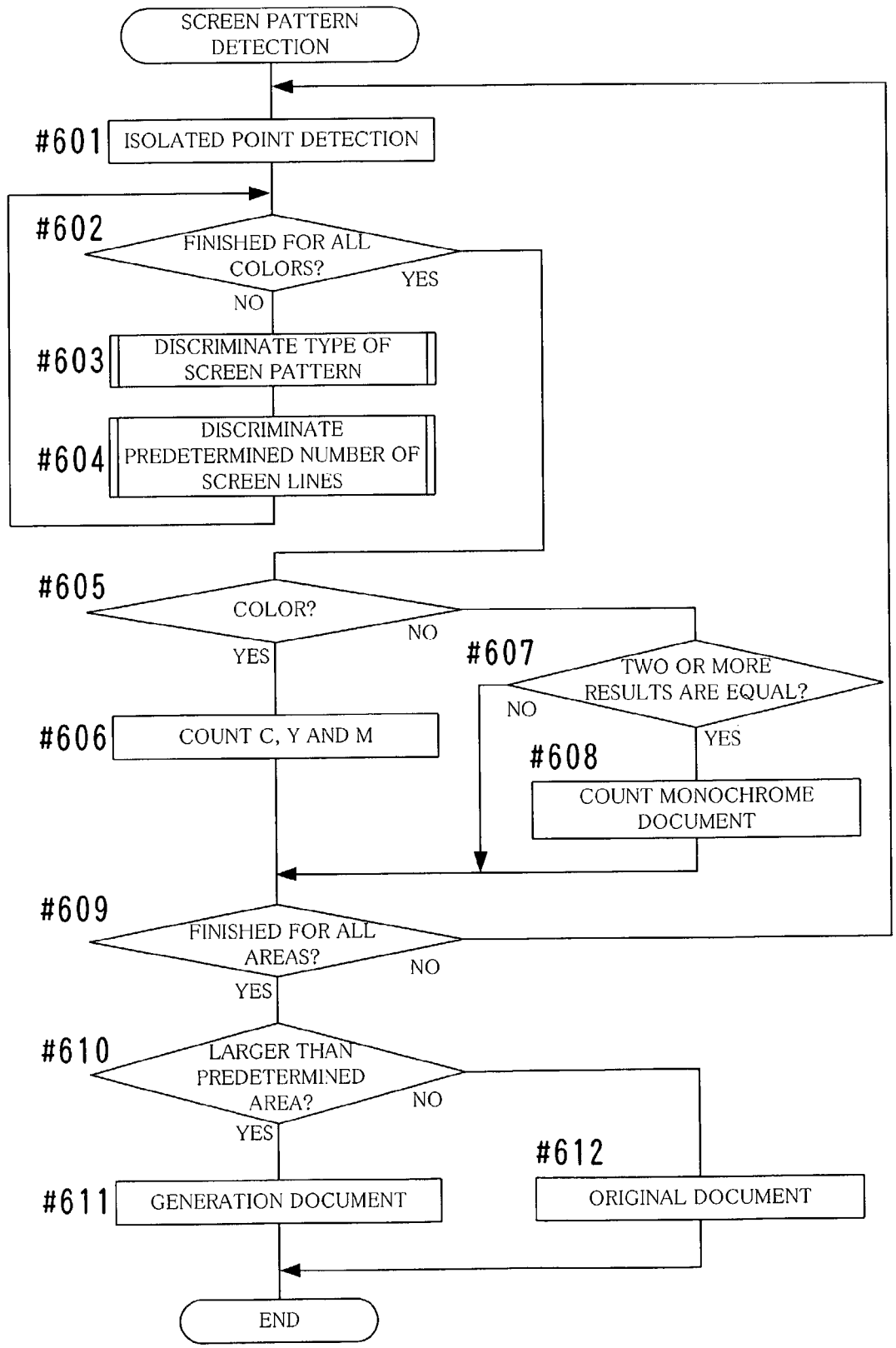
FIG. 26 is a flowchart for explaining an example of detection processing of a screen pattern when the screen pattern discrimination portion shown in FIG. 25 is applied.

FIG. 25 is a block diagram showing a modification of the screen pattern discrimination portion 212 and FIG. 26 is a flowchart for explaining an example of detection processing of a screen pattern when the screen pattern discrimination portion 212 shown in FIG. 25 is applied.

The screen pattern discrimination portion 212 (See FIGS. 4 and 6) may be structured as shown in FIG. 25 to detect the number of screen lines and a type of the screen pattern based on each of red, green and blue colors, and then, based on the detection results, to determine whether the document P1 is likely to be a generation document or an original document.

Each of an isolated point size detection portion 302R through a screen type detection portion 308R that constitute a screen attribute discrimination portion 30R shown in FIG. 25 performs the same processing as each of the isolated point size detection portion 302 through the screen type detection portion 308 shown in FIG. 6, basically. However, the isolated point size detection portion 302R through the screen type detection portion 308R perform processing based on a signal of red. Accordingly, the number of screen lines detection portion 307R and the screen type detection portion 308R detect the number of screen lines and a type of the screen pattern with respect to the red component, respectively.

A screen attribute discrimination portion 30G and a screen attribute discrimination portion 30B are structured similar to the screen attribute discrimination portion 30R. The screen attribute discrimination portion 30G and the screen attribute discrimination portion 30B detect the number of screen lines and a type of the screen pattern for a green component and a blue component, respectively.

In the screen pattern discrimination portion 212 with the structure mentioned above, processing is performed by steps shown in FIG. 26, for example. First, similar to the case of the step #101 shown in FIG. 7, an isolated point detection portion 301' detects an isolated point within each of areas into which the image of the document P1 is divided (#601). Then, a type of the screen pattern and the number of screen lines of each of red, green and blue colors are discriminated for each of the areas (#602-#604). Processing contents of the steps #603 and #604 are basically the same as that of FIGS. 10 and 12, respectively. The discrimination processing may be performed for each of the red, green and blue colors, sequentially, or may be performed in parallel.

A color discrimination portion 313 discriminates whether the document P1 is a color document or a monochrome document (#605). When the document P1 is discriminated as a color document (Yes in #605), a general discrimination portion 309' adds "1" to a counter 310 (a counter 310C, 310M or 310Y) of each of complementary colors of red, green and blue, i.e., cyan, magenta and yellow as discrimination results of the steps #603 and #604 with respect to each of red, green and blue colors. However, similarly to the case of FIG. 7, the addition is performed only when the number of screen lines is within a predetermined range and the screen pattern is a line screen.

When the document P1 is discriminated as a monochrome document (No in #605), the general discrimination portion 309' detects the number of screen lines of each of red, green and blue colors thereby to discriminate whether at least two out of the three detection results are equal to each other (#607). When the two or more results correspond to each other (Yes in #607), "1" is added to a counter 310 (310Z) for a monochrome document (#608).

Processing of the steps #601-#608 is repeated for all areas of the image of the document P1 (No in #609). The general discrimination portion 309' determines whether the document P1 is a generation document or an original document based on the value stored in each of the counters 310.

When the sum of the counters 310C, 310M and 310Y exceeds a predetermined value (Yes in #610), for example, it is discriminated that the document P1 is likely to be a generation document (#611). When the sum does not exceed the predetermined value (No in #610), it is discriminated that the document P1 is likely to be an original document (#612). Alternatively, when the value of the counter 310Z is above a predetermined value (Yes in #610), it is discriminated that the document P1 is likely to be a generation document (#611). When the value of the counter 310Z is not above the predetermined value (No in #610), it is discriminated that the document P1 is likely to be an original document (#612). In this way, the discrimination method differs in accordance with the kind of the document, i.e., the color document or the monochrome document, thereby leading to discrimination of a document type with reliability.

In the foregoing embodiments, structure, processing contents, processing order and timing for executing processing of each part or whole part of the digital color copier 1, the image processor 100, the document discrimination portion 203 can be varied as required within the scope of the present invention.

What is claimed is:

1. A document type discriminating apparatus comprising: a screen pattern detection portion that detects a type of a screen pattern used in an image captured by reading a document; a period change detection portion that detects a change in a period of the screen used in the image; a sharpness detection portion that detects sharpness of an edge seen in the image; a blur detection portion that detects a blur in a color of the edge seen in the image; and a document discrimination portion that discriminates that the document is a duplicate when at least two out of four discrimination results are true, the four discrimination results being discrimination as to whether or not the type of the screen pattern detected by the screen pattern detection portion is a line screen, discrimination as to whether or not a value indicating the change in the period of the screen detected by the period change detection portion exceeds a predetermined value, discrimination as to whether or not a value indicating the sharpness of the edge detected by the sharpness detection portion is lower than a predetermined value, and discrimination as to whether or not a value indicating the blur in the color of the edge detected by the blur detection portion exceeds a predetermined value.

2. A document type discriminating apparatus according to claim 1, further comprising: a number of screen lines detection portion that detects the number of screen lines seen in each of division areas into which the image is divided, each of the division area having a predetermined size; and a screen type discrimination portion that discriminates a type of a screen pattern used in the division area, wherein the screen pattern detection portion outputs a detection result of the type of the screen pattern of the image as a line screen when the number of screen lines in the division areas whose number is equal to or larger than a predetermined number is within a predetermined range, the number of screen lines being detected by the number of screen lines detection portion, and further when the type of the screen pattern discriminated by the screen type discrimination portion is the line screen.

3. A document type discriminating apparatus according to claim 2, further comprising: an isolated point size detection portion that detects a size of an isolated point seen in the image; an ambient brightness detection portion that detects brightness of a predetermined region surrounding the isolated point; an isolated point type discrimination portion for discriminating whether the isolated point is a white isolated point whose brightness is higher than that of pixels within a predetermined area surrounding the isolated point or a black isolated point whose brightness is lower than that of the pixels within the predetermined area surrounding the isolated point; and a continuity detection portion that detects continuity of placement of the isolated point included in each of the division areas, wherein, the number of screen lines detection portion detects the number of screen lines seen in the division area based on the brightness of the predetermined region surrounding the isolated point included in the division area, the brightness being detected by the ambient brightness detection portion, the size of the isolated point included in the division area, the size being detected by the isolated point size detection portion and the continuity of the placement of the isolated point included in the division area, the continuity being detected by the continuity detection portion, and the screen type discrimination portion discriminates the type of the screen pattern used in the division area based on the type of the isolated point included in the division area, the type being discriminated by the isolated point type discrimination portion and the continuity in the division area, the continuity being detected by the continuity detection portion.

4. A document type discriminating apparatus according to claim 1, further comprising: an isolated point interval detection portion that detects an interval among isolated points included in each of division areas into which the image is divided, each of the division area having a predetermined size, wherein the period change detection portion detects the change in the period of the screen used in the image by comparing the intervals of the isolated points in each of the division areas of the image, the intervals being detected by the isolated point interval detection portion.

5. A document type discriminating apparatus according to claim 1, further comprising: a spatial frequency characteristic detection portion that detects spatial frequency characteristic of a character area of the image, the character area including a character; and an indentation detection portion that detects an indentation of an edge in the character area, wherein the sharpness detection portion detects the sharpness of the edge seen in the image based on the spatial frequency characteristic detected by the spatial frequency characteristic detection portion and the indentation detected by the indentation detection portion.

6. A document type discriminating apparatus according to claim 1, wherein the blur detection portion detects the blur in the color of the edge seen in the image based on density of each of red, green and blue colors of an edge in a character area of the image, the character area including a character.

7. A document type discriminating apparatus according to claim 2, further comprising: a light and shade discrimination portion that discriminates whether the division area is a highlight area whose brightness is high or a shadow area whose brightness is low; and a counter that counts the number of highlight areas in which the number of screen lines detected by the number of screen lines detection portion is within a predetermined range, the highlight area being included in the division area and counting the number of shadow areas in which the type of the screen pattern is discriminated as the line screen by the screen type discrimination portion, the shadow area being included in the division area, wherein the screen pattern detection portion outputs a detection result of the type of the screen pattern of the image as the line screen when the value stored in the counter is a predetermined value or more.

8. A document type discriminating apparatus according to claim 2, further comprising: a color discrimination portion that discriminates whether the document is a color document or a monochrome document, wherein the number of screen lines detection portion detects the number of screen lines for each of primary colors of the image and the screen type discrimination portion discriminates the type of the screen pattern for each of the primary colors of the image.

9. A document type discriminating apparatus according to claim 8, wherein when the document is the color document, the screen pattern detection portion outputs a detection result of the type of the screen pattern of the image as the line screen when the number of screen lines for each of the primary colors is within a predetermined range and the number of division areas whose screen type for each of the primary colors is the line screen is equal to or larger than a predetermined number.

10. A document type discriminating apparatus according to claim 9, wherein when the document is the monochrome document, the screen pattern detection portion outputs a detection result of the type of the screen pattern of the image as the line screen when the number of division areas where two or more of the number of screen lines for each of the primary colors correspond to each other is equal to or larger than a predetermined number.

11. A computer program product comprising: a non-transitory computer-readable medium; and a computer program contained on the non-transitory computer-readable medium for performing the steps of: reading a document to capture an image of the document; detecting a type of a screen pattern used in the image; detecting a change in a period of the screen used in the image; detecting sharpness of an edge seen in the image; detecting a blur in a color of the edge seen in the image; and discriminating that the document is a duplicate when at least two out of four discrimination results are true, the four results being obtained by four processing of discrimination as to whether or not the type of the screen pattern is a line screen, discrimination as to whether or not a value indicating the change in the period of the screen exceeds a predetermined value, discrimination as to whether or not a value indicating the sharpness of the edge is lower than a predetermined value and discrimination as to whether or not a value indicating the blur in the color of the edge exceeds a predetermined value.

12. A document type discriminating apparatus according to claim 1, wherein the screen pattern detected by the screen pattern detection portion is a line screen when it is determined that a number of screen lines in a predetermined area is within a predetermined range.

* * * * *